United States Patent [19]

Hass et al.

[11] 4,311,683

[45] * Jan. 19, 1982

[54] PROCESS FOR REMOVAL OF HYDROGEN SULFIDE FROM GAS STREAMS

[75] Inventors: Robert H. Hass, Fullerton; Rowland C. Hansford, Yorba Linda, both of Calif.

[73] Assignee: Union Oil Company of California, Los Angeles, Calif.

[*] Notice: The portion of the term of this patent subsequent to Jan. 6, 1998, has been disclaimed.

[21] Appl. No.: 161,694

[22] Filed: Jun. 23, 1980

Related U.S. Application Data

[63] Continuation of Ser. No. 700,513, Jun. 28, 1976, Pat. No. 4,243,647, which is a continuation-in-part of Ser. No. 602,416, Aug. 6, 1975, abandoned, which is a continuation-in-part of Ser. No. 528,845, Dec. 2, 1974, abandoned.

[51] Int. Cl.$^3$ .......................................... C01B 17/04
[52] U.S. Cl. ............................... 423/573 G; 423/230
[58] Field of Search ................ 423/230, 570, 573, 574

[56] References Cited

U.S. PATENT DOCUMENTS

| | | | |
|---|---|---|---|
| 2,083,894 | 6/1937 | Connolly | 423/573 X |
| 2,083,895 | 6/1937 | Connolly | 423/573 X |
| 3,848,071 | 11/1974 | Groenendaal | 423/574 |
| 4,088,743 | 5/1978 | Hass et al. | 423/230 X |
| 4,092,404 | 5/1978 | Hass | 423/230 X |
| 4,169,136 | 9/1979 | Hass et al. | 423/573 G X |
| 4,171,347 | 10/1979 | Hass | 423/573 G X |

FOREIGN PATENT DOCUMENTS

| | | | |
|---|---|---|---|
| 600118 | 9/1946 | United Kingdom | 423/573 |
| 733064 | 7/1955 | United Kingdom | 423/230 |

*Primary Examiner*—G. O. Peters
*Attorney, Agent, or Firm*—Gregory F. Wirzbicki; Dean Sandford

[57] ABSTRACT

A process for the removal of $H_2S$ from a feed gas, and the production of sulfur therefrom, is effected by oxidation with oxygen and/or $SO_2$ at temperatures between 250° and 450° F. The oxidation is conducted in the presence of an extremely stable oxidation catalyst comprising an oxide and/or sulfide of vanadium supported on a non-alkaline porous refractory oxide. Sulfur deposition and consequent catalyst deactivation are prevented by maintaining the partial pressure of free sulfur in the oxidation reactor below that necessary for condensation. $H_2$, CO, and light hydrocarbons present in the feed gas are not oxidized. Typical uses of the process include the removal of $H_2S$ and the production of sulfur from sour natural gases or gases obtained from the gasification of coal.

Feed gases which contain $SO_2$ and $H_2S$ in mole ratios greater than 0.5, or which contain other gaseous sulfur compounds such as COS, $CS_2$, $SO_3$ and mercaptans, can be desulfurized by hydrogenating all of such sulfur components to $H_2S$ and subsequently removing the $H_2S$ from the hydrogenated feed gas by the oxidation process of the invention. This hydrogenation-oxidation combination is especially contemplated for the desulfurization of Claus tail gases and stack gas effluents.

43 Claims, 4 Drawing Figures

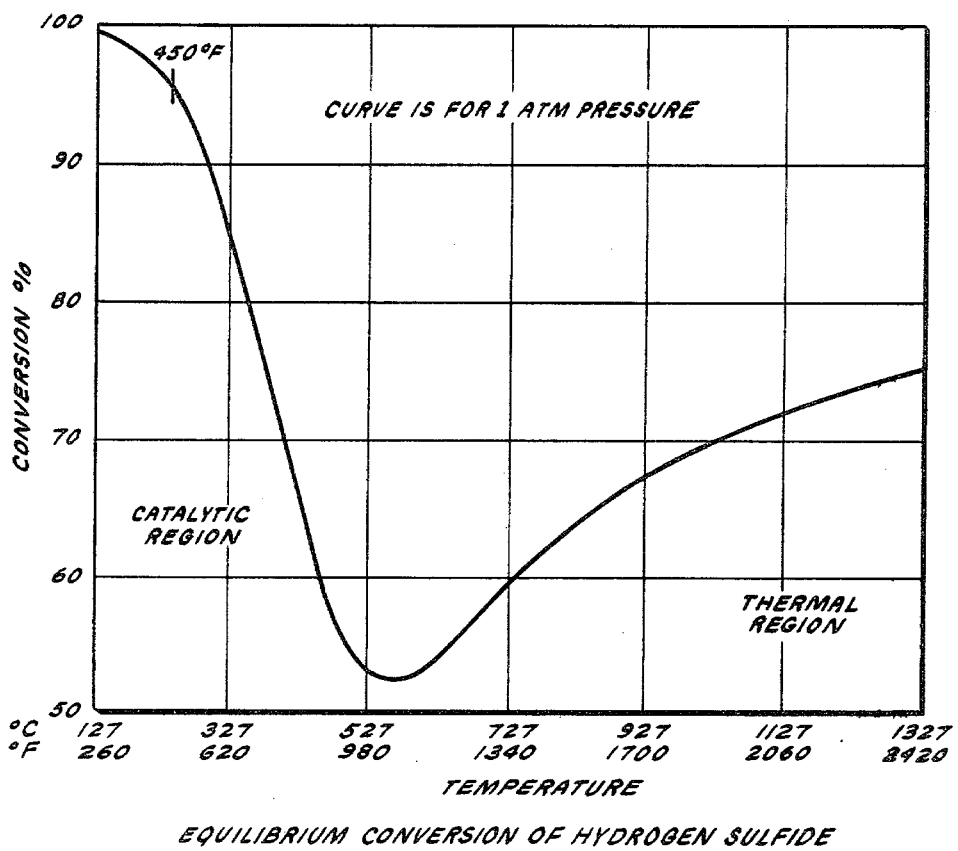

EQUILIBRIUM CONVERSION OF HYDROGEN SULFIDE

THEORETICAL EQUILIBRIUM CONVERSION OF HYDROGEN SULFIDE TO SULFUR VAPOR BY SELECTIVE OXIDATION WITH STOICHIOMETRIC AIR ACCORDING TO THE OVER-ALL EQUATION:

$$2H_2S + O_2 \longrightarrow 2H_2O + 2S$$

(WHICH INCLUDES THE REVERSIBLE REACTION:

$$2H_2S + SO_2 \rightleftharpoons 2H_2O + 3S, \text{ THE } SO_2 \text{ HAVING BEEN}$$

GENERATED BY THE CONCURRENT REACTION:

$$2H_2S + 3O_2 \longrightarrow 2SO_2 + 2H_2O)$$

FIG. 1

CONVERSION OF H₂S TO SULFUR
AS FUNCTION OF GAS DEW POINT

PROCESS FOR REMOVAL OF HYDROGEN SULFIDE FROM GAS STREAMS

This is a continuation, of application Ser. No. 700,513, filed June 28, 1976 now U.S. Pat. No. 4,243,647, which is a continuation-in-part of abandoned application Ser. No. 602,416, filed Aug. 8, 1975, which is itself a continuation-in-part of Ser. No. 528,845, filed Dec. 2, 1974, now abandoned.

BACKGROUND OF THE INVENTION

The present invention relates to the removal of $H_2S$ and recovery of free sulfur from feed gases containing $H_2S$. More specifically, it is concerned with a process for the selective oxidation of $H_2S$ to elemental sulfur in gas streams which may also contain $H_2$, CO or light hydrocarbons, said selective oxidation being conducted in the thermodynamically favorable temperature range of 250°–450° F. The process is especially useful in the desulfurization of Claus tail gas streams.

The removal of $H_2S$ and recovery of sulfur from $H_2S$-containing gases has been of major importance to industry. Petroleum refiners and natural gas suppliers in particular are concerned with such processes because $H_2S$ is present in many refinery gas streams and natural gases. Its presence in such gases is undesirable because of its noxious odor, toxicity, corrosive properties and, recently, because of its contribution to atmospheric pollution. As a result, numerous processes have been advanced to obviate the difficulties associated with the use or disposal of gases laden with $H_2S$ by removing it and effecting a conversion to marketable free sulfur.

The most successful method employed on a commercial basis which recovers sulfur from $H_2S$-contaminated feed gases (especially sour natural gases and the like) is a process in which the $H_2S$ is first absorbed from the feed gases in solvents such as alkanolamines. These solvents are then stripped to recover a gas comprising about 85% $H_2S$ and 15% $CO_2$ which is then processed for sulfur recovery in a Claus plant. Quite typically, this Claus process involves the combustion of a portion of the recovered gas to obtain sufficient $SO_2$ to provide a 1:2 mole-ratio with $H_2S$ when the incinerated gases are recombined with the remaining recovered gas. This mixture is processed through a series of two or three reactors containing a bauxite catalyst which effects the oxidation of $H_2S$ according to the well known Claus reaction:

$$2H_2S + SO_2 \rightleftharpoons 3S + 2H_2O$$ 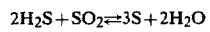

The sulfur produced in each reactor is condensed in sulfur condensers situated after each reactor, thus desulfurizing the recovered gas in successive stages. Although this process is used in many industries, the economical removal of $H_2S$ from the original feed gas stream to the Claus plant is limited to about 94 to 97% due to equilibrium limitations imposed by Reaction (I).

Because of the costly multi-step absorption-oxidation operations inherent in the Claus type of purification process, and the increasingly stringent environmental control standards, it has become a matter of great concern to develop a more economical process for the direct, and more complete, conversion of $H_2S$ present in feed gas streams to elemental sulfur. Ideally, such a process would utilize only air or oxygen as an oxidant (without the necessity for separate facilities to produce $SO_2$), would be entirely catalytic and be performed essentially in the gaseous phase. Also, the process should treat the feed gas directly, thus eliminating the costly absorption step. Heretofore, no process of this nature has been a practical possibility. Attempts directly to oxidize $H_2S$ with air according to:

$$2H_2S + O_2 \rightarrow 2S \text{ (vapor)} + 2H_2O \qquad (II)$$ 

necessarily also result in formation of some $SO_2$ according to:

$$2H_2S + 3O_2 \rightarrow 2SO_2 + 2H_2O \qquad (III)$$ 

or $$S \text{(vapor)} + O_2 \rightarrow SO_2 \qquad (IV)$$ 

The $SO_2$ produced by Reaction (III) or (IV) then reacts with $H_2S$ as in Reaction (I), and the final conversion of $H_2S$ is thus still dependent to some extent upon the equilibrium limitations of Reaction (I). Also, light hydrocarbons, CO or $H_2$, if present in the feed gas, are usually oxidized to $CO_2$, COS and water vapor, the formation of the latter further reducing conversion as defined by the thermodynamics of Reaction (I). The end result is not only a loss of sulfur recovery but also a possible loss of fuel gases and the production of an incompletely purified product gas.

Temperatures are of extreme importance in these oxidation processes because, as shown in FIG. 1, the thermodynamics of Reaction (I) permits the highest conversion of $H_2S$ to sulfur at relatively low temperatures of 250° to 450° F. At these temperatures, however, the oxidation reaction kinetics are poor and no prior art catalysts are known which can effectively operate at these low temperatures. Additionally, at these low temperatures the condensation of sulfur on the catalyst may cause reactor plugging and/or catalyst deactivation. Efforts to deal with this condensation problem, such as by the use of swing reactors so as to permit frequent catalyst regeneration, increase the costs of operation. Hence, while low temperature operation is desirable, it is not without difficulties.

The several attempts to produce a competitive alternative to the Claus process and to effect direct catalytic oxidation of $H_2S$ in a feed gas with air or oxygen at low temperatures resulted in, at best, only marginal results. This was due in large measure to the difficulties just mentioned. The earliest methods, as disclosed in U.S. Pat. Nos. 1,922,872 and 2,298,641, sought to employ bauxite catalysts of the kind utilized in the Claus process, or variations of those catalysts, to catalyze the desired oxidation. Such catalysts were found to be useful at temperatures above 450° F. if the feed gas contained relatively high concentrations (>10%) of $H_2S$, but at low temperatures or with low feed concentrations of $H_2S$ the reaction tended to be sluggish and resulted in poor conversions. Generally, at such low temperatures the typical bauxite catalyst was found to be ineffective and required a follow-up operation, such as the absorption technique disclosed in U.S. Pat. No. 2,355,147, completely to remove the $H_2S$. On a commercial basis, bauxite type catalysts alone have been used only at high temperatures between 800° and 1100° F., at which temperatures $H_2$ and light hydrocarbon gases are readily oxidized. Thus, although the conversion of $H_2S$ was more rapid due to the kinetics of Reaction (I) at such temperatures, the bauxite catalyst lost its selectivity for oxidizing $H_2S$ and conversions were necessarily poorer due to the thermodynamics of Reaction (I), as shown in FIG. 1.

The use of other catalysts at the desirable low temperatures of 250° to 450° F. has only been of limited success. For instance, sodium aluminosilicate zeolite catalysts, as described in U.S. Pat. No. 2,971,824, have been reported to lose their effectiveness rapidly at below 450° F. Other catalysts of an alkaline nature, such as the alkali metal sulfides disclosed in U.S. Pat. No. 2,559,325, and the combination of alkali metal and alkaline earth metal oxides disclosed in U.S. Pat. No. 2,760,848, have been reported to produce no $SO_2$ in the product gas even in the presence of excess oxygen. Since the formation of $SO_2$ is inevitable even under conditions wherein insufficient oxygen (for Reaction (II)) is available, it is surmised that the $SO_2$ reacted with the alkali present in the catalyst by an acid-base reaction. This would account for the lack of $SO_2$ in the effluent gases and would result not only in a loss of alkalinity in the catalyst but also in rapid loss of catalytic activity and conversion efficiency.

Thus far, it has been shown that the need for an all gaseous phase, low-temperature, catalytic process for the selective conversion (i.e., in the presence of $H_2$, CO and light hydrocarbons) of $H_2S$ in a feed gas to sulfur is both great and unsatisfied. In many situations, however, the feed gas to be treated contains, in addition to $H_2S$, other gaseous sulfur components such as $CS_2$, COS, $SO_2$, etc., which should also be removed. If the feed gas contains $SO_2$ and $H_2S$ in a molar ratio of $SO_2/H_2S$ less than or equal to 0.5, then it is theoretically possible to remove both sulfur components by oxidation-reduction. The reason for this lies in the fact that when these two components exist in such ratios, one need only add sufficient oxygen to the feed gas to give a ratio therein of $(O_2+SO_2)/H_2S$ equal to 0.5, the stoichiometric ratio required for Reactions (I) and (II) for the production of sulfur. More often, however, these ratios do not exist or the feed gas contains other gaseous sulfur compounds, of which a sizeable proportion exists as $CS_2$, COS and mercaptans. To remove these gases, the prior art has relied heavily on the desulfurization process taught by Beavon in Canadian Pat. No. 918,384. In this process the Claus tail gas is contacted with an alumina-based cobalt-molybdate catalyst at temperatures from about 300° F. to about 1200° F. in the presence of sufficient $H_2$ to convert essentially all of the sulfur gases contained in the tail gas to $H_2S$. These hydrogenated Claus tail gases are then oxidized in any convenient manner to yield elemental sulfur. One such oxidizing method disclosed in the Beavon patent is the Claus process previously described, with its attendant limitations. Another is the so-called Stretford process described in U.S. Pat. No. 3,097,926 wherein a rather expensive liquid phase oxidation effects the conversion of $H_2S$ to elemental sulfur through the employment of a catalytic solution of sodium vanadates. Other processes have utilized various adsorption-desorption or absorption-reaction techniques to produce similar results; but no all gas phase catalytic process has been commercially employed for this purpose.

It is apparent from the foregoing that an all gaseous phase, low temperature, direct catalytic process for the air oxidation of $H_2S$ contained in a feed gas to elemental sulfur would be highly desirable. It could be used alone to remove $H_2S$ (or both $H_2S$ and $SO_2$ in specified ratios) from a feed gas stream, or in combination with a Beavon hydrogenation process, completely to desulfurize a feed gas stream containing other gaseous sulfur components (or $H_2S$ and $SO_2$ in other ratios). Furthermore, any $H_2$, CO, or light hydrocarbons present in the gases to be treated by the aforementioned catalytic process should not be oxidized to form COS, water, or $CO_2$ because: (1) COS is itself a noxious contaminant; (2) the formation of water tends to inhibit the conversion of $H_2S$ to sulfur; (3) the oxidation reactions producing these undesired product components are very exothermic and this in turn creates difficulties in maintaining the operating temperature in the thermodynamically desirable range of 250° to 450° F.; and (4) the production of these undesirable products consumes oxygen, thus competing with Reaction (II) for the available oxidant. Because of these, and other difficulties mentioned hereinbefore, the development of a commercial, all gaseous phase, low temperature, catalytic process has not yet become a reality.

SUMMARY OF THE INVENTION

The present invention provides a novel process for oxidizing $H_2S$ to elemental sulfur with air or oxygen completely in the gaseous state in the temperature range of 250° to 450° F. $H_2S$ conversions over 99% are achievable. $H_2$, CO, or light hydrocarbons, if present in the feed gas, remain substantially completely unoxidized and form none of the deleterious derivative compounds, $CO_2$, COS, or water. No sulfur deposition occurs on the catalyst because the sulfur partial pressure is maintained below that necessary for sulfur condensation. Furthermore, the catalyst employed maintains its high activity for at least 30 days, normally for at least 90 days. The process is most ideal for the treatment of sour natural gases, sour refinery gases, gases obtained from the gasification of coal, and for stack gases or Claus tail gases which have been hydrogenated as in the Beavon process.

In addition to removing $H_2S$ from a feed gas stream, the oxidation process of the invention can also be used, or combined with the Beavon hydrogenation process, to desulfurize feed gases which contain other gaseous sulfur compounds. For desulfurization purposes the oxidation process of the invention can effectively treat those feed gases containing as essentially the only gaseous sulfur compounds therein, $H_2S$ or both $SO_2$ and $H_2S$ in a mole-ratio of $SO_2/H_2S$ no greater than 0.5. Feed gases containing other gaseous sulfur compounds (such as COS, $CS_2$, and mercaptans), or $SO_2$ and $H_2S$ in a mole-ratio greater than 0.5, are most effectively desulfurized by hydrogenating all gaseous sulfur compounds in said feed gases to $H_2S$ by means of the Beavon process, and subsequently oxidizing the $H_2S$ in the hydrogenated feed gases to sulfur by the oxidation process of the invention.

The oxidation process of the invention involves first cooling the gases containing $H_2S$ as low as feasible, preferably to below 120° F., and removing the condensed water. Other dehydration techniques may also be employed. The gases are then blended with a stoichiometric amount of air or oxygen to effect the conversion of $H_2S$ to elemental sulfur and the mixture may, if necessary, be blended with sufficient inert gas not only to maintain the temperature of the subsequent reaction in the oxidation reactor between 250° and 450° F., but also to dilute the sulfur vapor and prevent condensation thereof on the catalyst. The oxidation reactor contains a catalyst having high activity for the efficacious conversion of $H_2S$ to sulfur at low temperatures;

its composition comprises a vanadium oxide and/or sulfide supported on a non-alkaline, porous refractory oxide. The effluent gases from the oxidation reactor are condensed to obtain free sulfur and a purified gaseous product.

BRIEF DESCRIPTION OF THE DRAWINGS

FIG. 1 is a graph showing the theoretical thermodynamic conversions of $H_2S$ to sulfur by air oxidation under anhydrous feed inlet conditions, said air oxidation occurring between 260° and 2400° F.

DETAILED DESCRIPTION OF THE INVENTION

Figure 2:
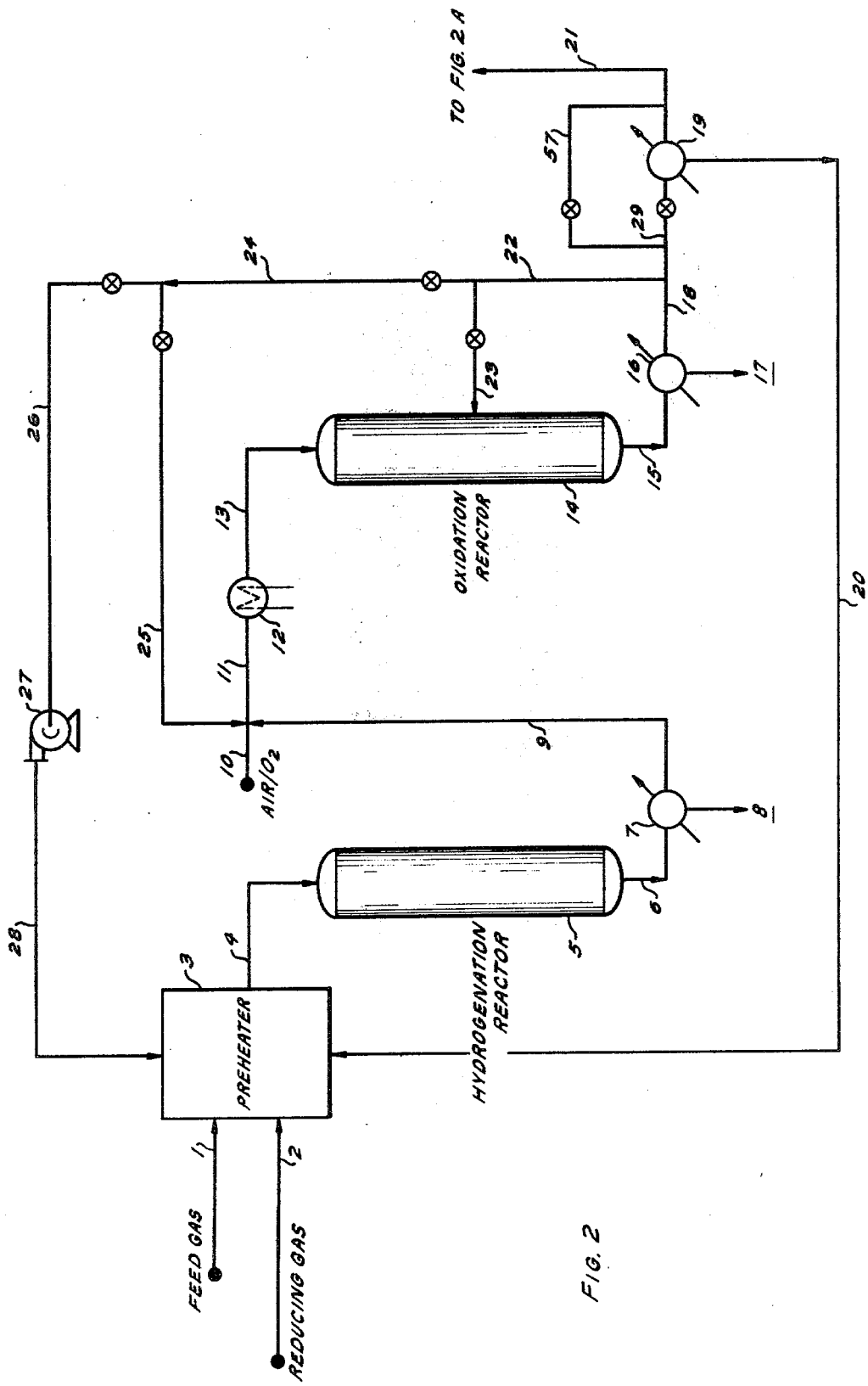
FIGS. 2 and 2A are a flow diagram depicting the manner in which a gas similar to Claus tail gases or stack gases would be desulfurized by the invention.

The present invention provides for the desulfurization, by oxidation, of feed gases containing gaseous sulfur compounds and any of the relatively inert inorganic gases such as $N_2$, $CO_2$, Ar, He, Ne, etc., and/or any of the normally oxidizable components such as $H_2$, CO, and light hydrocarbons. (As used herein, the term light hydrocarbons shall refer to saturated hydrocarbons containing no more than six carbon atoms. As used herein, the term desulfurization is defined as the removal from a feed gas of the gaseous sulfur components contained therein, said gaseous sulfur components being selected from the class consisting of $H_2S$, $SO_2$, COS, $CS_2$, $SO_3$, sulfur vapor, and mercaptans. As used herein, the term mercaptans shall refer to those saturated mercaptans containing no more than six carbon atoms.) The gases which can be removed by the process of this invention include $H_2S$, $SO_2$, COS, $CS_2$, $SO_3$, sulfur vapor, and mercaptans. The process is most advantageously utilized for treating "sour" gases containing at least about 50, usually at least about 100 ppmv, but less than about 10 mole % of $H_2S$, and at least about 100, usually at least about 500 ppmv, of at least one normally oxidizable component selected from the class consisting of $H_2$, CO, and light hydrocarbons. Other components found in these and other feed gases usually consist of one or more of: $CO_2$, $N_2$, $H_2O$, $O_2$, $SO_2$, COS, and $NH_3$. As those skilled in the art will understand, many other components may be present in the feed gas to be desulfurized, but they should be chemically inert under the desulfurization conditions to be utilized, and should not adversely affect or poison the catalyst or catalysts with which they will come in contact.

The particular desulfurization technique to be utilized herein depends in large measure upon the nature of the gaseous sulfur compounds to be removed. In instances wherein the feed gas contains COS, $CS_2$, $SO_3$, or mercaptans, or if it contains $SO_2$ in a molar ratio with $H_2S$ greater than about 0.5, hydrogenation of all such gases to $H_2S$ is necessary for best results prior to being treated by the oxidation process of the invention. Feed gases normally requiring such prehydrogenation include, but are not limited to, Claus tail gases and some refinery stack gases. (In such cases it is preferred that oxygen be present in the feed gases in quantities no greater than about 1000 ppmv; otherwise a permanent poisoning of the hydrogenation catalyst may ensue.) On the other hand, if the only sulfur compounds present in the feed gas which need be removed therefrom are $H_2S$, or $SO_2$ and $H_2S$ in an $SO_2/H_2S$ molar ratio less than or equal to 0.5, the simple oxidation process of the invention is all that is required for their removal and the recovery of sulfur. Examples of feed gases capable of being so treated include, but are not limited to, sour natural gases, sour refinery gases (including sour hydrogen-rich recycle gases) and gases obtained from the gasification of coal. In the examples and description to follow herein, it will be shown how Claus tail gases and sour natural gases, as examples of the two types of feed gases just mentioned, can be desulfurized.

(It should be noted that sulfur vapor may be present in any proportion in either of the two types of feed gases to be exemplified. As a practical matter, however, since the removal of sulfur vapor is best accomplished by condensation, its presence in a feed gas, other than in minute quantities, will probably be rare.)

According to a specific embodiment of the present invention, Claus tail gases are purified of sulfur-containing compounds and free sulfur is obtained. In this process it is firstly necessary to convert the sulfur containing components to $H_2S$ and then to oxidize the $H_2S$ so formed to elemental sulfur. This embodiment of the invention will be more clearly understood by reference to the accompanying flow diagram, FIG. 2. The Claus tail gases are brought in via line 1 and combined at substantially atmospheric pressure, or at any other convenient pressure between about 5 and 500 psia, with water vapor and reducing gases from line 2, which reducing gases comprise in the preferred method of operation, $H_2$ and/or CO generated by partial combustion of a fuel gas. In a preheater 3 the mixture of gases is heated to between 300° and 800° F., preferably to between 500° and 800° F., and more preferably still, to between about 600° and 700° F. The quantity of water vapor and reducing gas is controlled to provide at least a sufficient amount of each component stoichiometrically to convert all the sulfur-containing gases in the Claus tail gas to $H_2S$ by hydrogenation or hydrolysis. Preferably about 1 to 2½ times the stoichiometric amount of reducing gas, and 1 to 1½ times the stoichiometric amount of water vapor are provided. The mixture of heated gases is directed through line 4 to the hydrogenation reactor 5 wherein said sulfur-containing gases are converted to $H_2S$ according to the following reactions:

$$SO_2 + 3H_2 \rightarrow H_2S + 2H_2O \qquad (V)$$

$$S + H_2 \rightarrow H_2S \qquad (VI)$$

$$CH_3SH + H_2 \rightarrow CH_4 + H_2S \qquad (VII)$$

$$CS_2 + H_2O \rightarrow COS + H_2S \qquad (VIII)$$

$$COS + H_2O \rightarrow CO_2 + H_2S \qquad (IX)$$

$$SO_3 + 4H_2 \rightarrow H_2S + 3H_2O \qquad (X)$$

If CO is utilized as a component of the reducing gas, it is hydrolyzed in the hydrogenation reactor 5 to form $H_2$ and $CO_2$ according to:

$$CO + H_2O \rightarrow CO_2 + H_2, \qquad (XI)$$

said $H_2$ then being active for the conversion of the sulfur-containing compounds to $H_2S$ as previously described. In this case, of course, sufficient water must be available not only to convert the COS and $CS_2$ to $H_2S$, but also for the hydrolysis of CO to $H_2$.

The hydrogenation reactor 5 preferably contains a presulfided, sulfactive cobalt molybdate hydrofining catalyst, but any prereduced sulfactive hydrofining catalyst comprising one or more of the Group VIB metal oxides and/or sulfides with one or more iron group metal oxides and/or sulfides is suitable. The preferred catalyst, however, is one composed of about 3–8% cobalt oxide and about 8–20% molybdenum oxide on alumina in presulfided, reduced form. These catalysts in the preferred temperature range of 600° to 800° F. are extremely effective in producing $H_2S$ according to Reactions (V) through (X) from the sulfur compounds present in Claus tail gases; equilibrium conversions in excess of 80%, sometimes up to 100%, complete can be obtained. Lower temperatures in the range of 300°–600° F. are also effective if the feed gas contains no COS, $CS_2$ or mercaptans. Gaseous space velocities between 700 and 4000 v/v/hr can be utilized although preferred space velocities range between about 1500 and 2500 v/v/hr. Pressures of about 0–200 psig are preferred.

Figure 3:
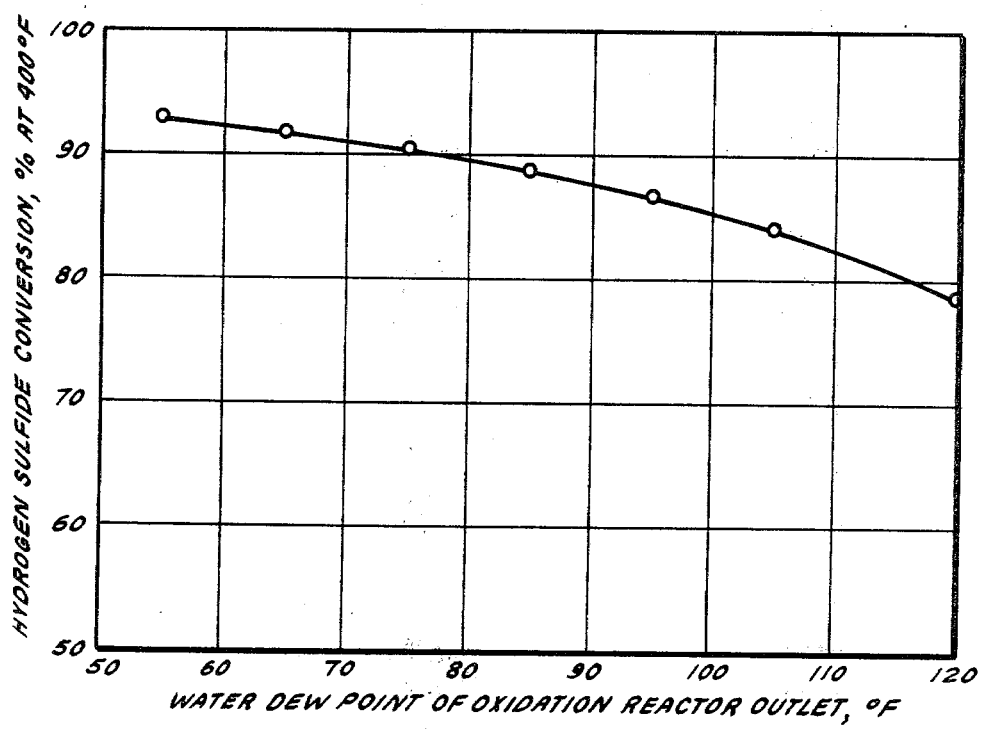
FIG. 3 is a graph depicting the percentage of the theoretical thermodynamic conversion at 400° F. one can expect to obtain if the oxidation of Reaction (II) is conducted in the presence of a gas stream having a water vapor dew point between 50° and 120° F.

After leaving hydrogenation reactor 5 through line 6 the hydrogenated Claus tail gases, now containing $H_2S$ as substantially the only sulfur component therein, are cooled to remove water via line 8 by means of a condenser 7. Water could, of course, be eliminated from the gases in a number of ways, including by absorption in desiccants, but it is important at this point to remove as much water as is economically possible. As shown in FIG. 3 the conversion of $H_2S$ to sulfur at 400° F. by the oxidation process to be described hereinafter is thermodynamically dependent upon the amount of water vapor present in the hydrogenated Claus tail gases, and conversions from as low as 80% to as high as 95% can be achieved. Thus, unless lower conversions are sufficient, or the gases leaving hydrogenation reactor 5 are inherently low in water vapor concentration, it is preferred that the hydrogenated gases be cooled to about 50°–130° F. to condense sufficient water to yield a gas containing less than about 15%, preferably less than about 10% by volume of water vapor, so that at least an 80 to 90% conversion of $H_2S$ to sulfur can be accomplished. Better conversions, however, can be achieved if still lower condensation and/or reaction temperatures are utilized.

The hydrogenated Claus tail gases, dehydrated for example to a water vapor dew point in the range of 50°–60° F., are passed from line 9 to line 11 and are therein mixed with air or free oxygen introduced from line 10. It is highly desirable in carrying out the subsequent conversion in oxidation reactor 14 that the air or oxygen be supplied via line 10 such that the resultant mixture of gases in line 11 contains only the stoichiometric amount of oxygen necessary according to Reaction (II) to effect the conversion to sulfur of all the $H_2S$ in the mixture. It has been found that the use of air in amounts substantially below or above that necessary for Reaction (II), although contemplated herein, generally results in poor conversions of $H_2S$ to sulfur. Additionally, as will be explained hereinafter, the use of excess oxidant may deactivate some forms of the oxidation catalyst hereinafter to be described by sulfation. Thus, although the use of oxygen in amounts other than the stoichiometric amount required for Reaction (II) may be found feasible or utilitarian in some instances, it is recommended that oxygen, preferably in the form of air, should be supplied in substantially the exact stoichiometric amount required by Reaction (II).

Other oxidants capable of being fed via line 10 are those comprising free oxygen and/or $SO_2$, the latter producing sulfur via Reaction (I). For the same reasons noted hereinbefore with respect to oxygen and air, these oxidants should be utilized only in the stoichiometric amounts necessary to produce sulfur. Thus, gases comprising oxygen and/or $SO_2$ should be added such that the hydrogenated Claus tail gas-oxidant mixture in line 11 will contain $O_2$ and/or $SO_2$ in a molar ratio with $H_2S$ substantially equal to 0.5, i.e., $(O_2+SO_2)/H_2S = 0.5$.

The mixture of hydrogenated Claus tail gases and preferably stoichiometric air (for Reaction II)) is preheated in preheater 12 to a temperature of at least about 250° F. but no more than 450° F., and fed via line 13 to the oxidation reactor 14 at a space velocity between about 250 and 2000 v/v/hr, but preferably between about 800 and 1000 v/v/hr. These gases contact a catalyst in the oxidation reactor 14 at temperatures ranging between about 250° and 450° F., preferably about 300°–400° F. The catalyst comprises a vanadium oxide and/or sulfide supported on a non-alkaline, porous refractory oxide. This catalyst, described in fuller detail hereinafter, is highly active for the conversion of $H_2S$ to elemental sulfur in the thermodynamically favorable, but kinetically unfavorable, temperature range of 250° to 450° F. When operating within this temperature range, 90 to 95% conversions of $H_2S$ to sulfur are easily achieved, even at high space velocities. Furthermore, because the catalyst is selective for the oxidation of $H_2S$, such highly oxidizable components as $H_2$, CO, and light hydrocarbons, which all might be present, remain essentially completely unoxidized.

As with all oxidations of $H_2S$ to sulfur utilizing only air or oxygen as oxidant, it is believed that some of the $H_2S$ oxidized to sulfur in oxidation reactor 14 is converted via Reaction (II) while the remainder is converted via Reaction (III) followed by (I). Since the latter is water vapor equilibrium limited, the importance of removing water via condenser 7 as hereinbefore set forth becomes more apparent. Additionally, since it is desirable to minimize the equilibrium limitation of Reaction (I), it will be seen that those gases containing only oxygen as oxidant will tend to form less sulfur via Reaction (I) than those comprising $SO_2$. This is an additional advantage in using only those oxidant gases comprising free oxygen and substantially no $SO_2$.

The sulfur vapor contained in the gases leaving the oxidation reactor 14 through line 15 is first condensed, preferably at about 250°–270° F., in a sulfur condenser 16 wherefrom molten sulfur is discharged via line 17. Optionally and preferably, the off-gases in line 18 are further purified of water, sulfur, and water-soluble sulfur compounds (notably $SO_2$) in another condenser 19 operating below about 70° F., more preferably between about 40°–50° F. Sour water containing some $SO_2$ is thus removed via line 20 for reprocessing to preheater 3. In addition, this second condensation in condenser 19 removes (in the case of Claus tail gases) an additional 50–150 ppm of sulfur vapor from the gases, leaving a gas purified of at least 80% but usually at least 90% of the original sulfur components contained in the Claus tail gas feed. Also, by reprocessing the sour water, sulfur components are recovered for further treatment within the process, thus eliminating costly extraneous desulfurization procedures and improving overall desulfurization efficiency.

The off-gases from the sulfur condenser 16 can, because of the complete consumption of oxygen (i.e., when preferred operating conditions are utilized) in the oxidation reactor 14, be partly recycled for conversion of residual $SO_2$ to $H_2S$ via lines 22, 24, 26, 28 and blower 27 to preheater 3. The absence of oxygen in these recycle gases permits recycle without deactivation of the cobalt-molybdate hydrogenation catalyst in reactor 5, and by this recycle procedure a portion of the unconsumed reducing gas supplied via line 2 is utilized for conversion of the residual $SO_2$. Other uses for the recycle gas, to be explained in more detail hereinafter, include direct temperature control of the exothermic oxidation reactions in reactor 14 by quenching via lines 18, 22 and 23, and indirect temperature control by dilution of the hydrogenated feed gas-oxidant mixture entering the oxidation reactor 14 via lines 18, 22, 24 and 25.

Figure 2A:
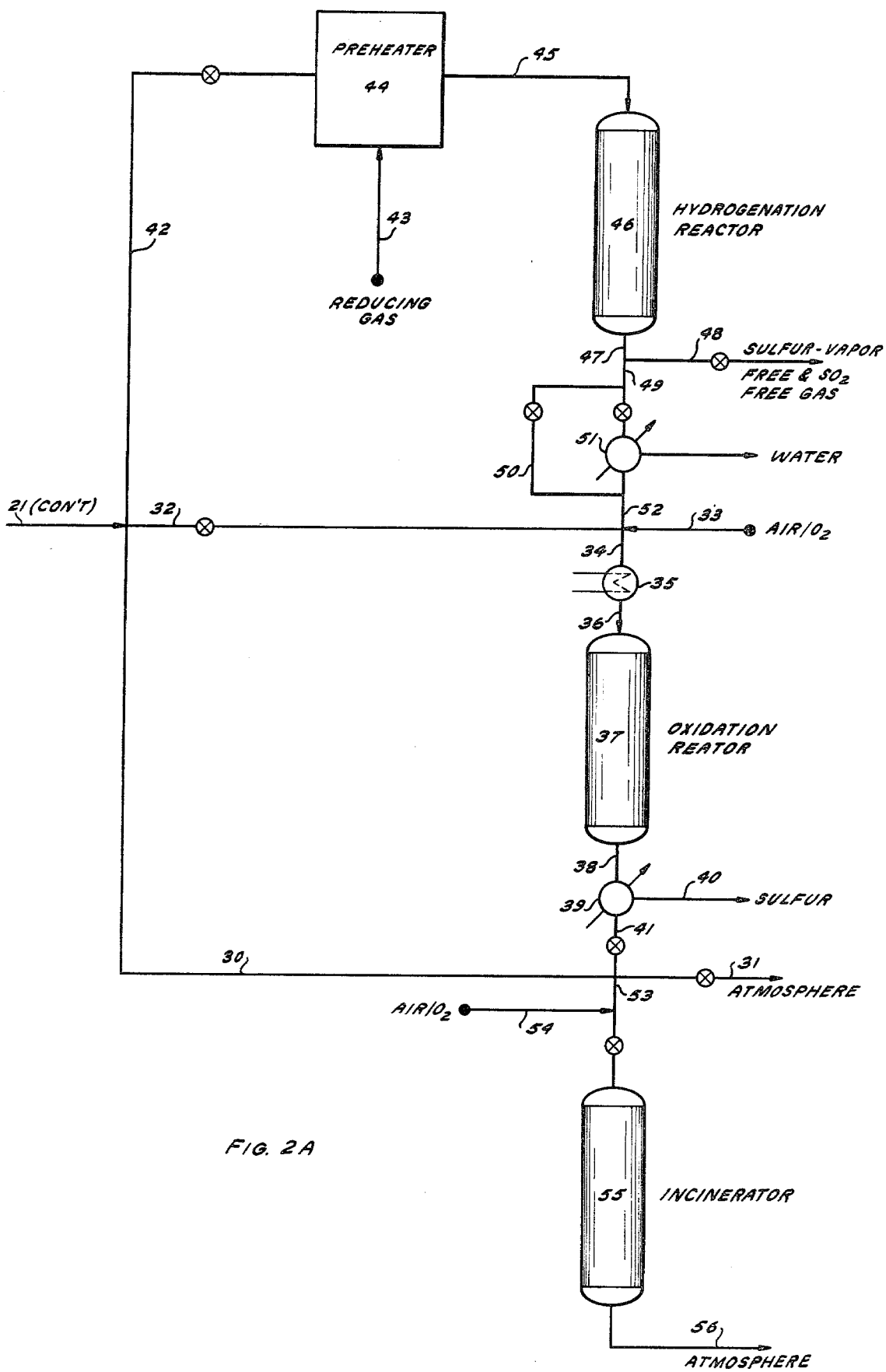

The off-gases from condenser 19 can, as shown in FIG. 2A, either be discharged to the atmosphere via lines 21, 30 and 31 or subjected to one of a number of post treatments. One such post treatment consists in removing most of the remaining $H_2S$, $SO_2$ and sulfur vapor contained in these gases by means of a second stage of partial oxidation. This is accomplished by combining the gases transported via lines 21 and 32 with sufficient oxidant, preferably air or oxygen, from line 33 to provide in the resultant mixture a mole-ratio of $(O_2 + SO_2)/H_2S$ of preferably about 0.5, thus meeting the stoichiometric requirements for Reactions (I) and (II). This mixture is then passed via line 34 to preheater 35 wherein it is heated to between about 250° and 450° F. and then fed via line 36 at a space velocity between about 250 and 2000 v/v/hr, but preferably between about 800 and 1000 v/v/hr, to the second oxidation reactor 37.

This second oxidation reactor 37 may contain any of the catalysts hereinafter described in fuller detail for use in the first oxidation reactor 14. Also, it can be operated in the same broad and preferred temperature ranges of 250°–450° F. and 300°–400° F., respectively, as recommended for the first reactor. However, because the concentration of reactant sulfur compounds (i.e., $H_2S$, $SO_2$ and sulfur vapor) in the gases entering reactor 37 is much lower than that entering the first (thus producing lower sulfur vapor dew points upon being converted to sulfur), the lower thermodynamically favorable temperatures of about 250°–350° F. can usually be safely maintained therein. When a second stage oxidation reactor is thus utilized, conversions therein of $H_2S$ to elemental sulfur between about 50% and 90% complete can be achieved. Usually however, conversions in excess of 80% complete can be obtained. Overall desulfurization through the use of the hydrogenation reactor followed by two oxidation reactors as described can result in the removal of greater than about 95%, even greater than 99%, of the total sulfur compounds in the original Claus tail gas feed. Following the oxidation in reactor 37, the gases are sent via line 38 to sulfur condenser 39 operating between 260° and 280° F. to produce sulfur via line 40. The remaining purified gases are then sent either to atmosphere through lines 41 and 31 or to an incinerator 55 as described hereinafter.

The following two examples of a desulfurization process essentially as described above are provided to illustrate the effectiveness of the invention. It will be shown how Claus tail gases can be desulfurized to meet present atmospheric pollution regulations (in the Los Angeles basin area) requiring the discharge of less than 500 ppm total sulfur compounds and no more than 10 ppm $H_2S$. In all examples herein, the results are reported on a dry mole-percent basis, and although the purified gas streams shown therein contain more than 10 ppm of $H_2S$, this level can easily be reached by conventional incineration of the $H_2S$ to $SO_2$.

EXAMPLE I

After being blended with products from a reducing gas generator, a Claus tail gas had a composition, reported on a dry basis (30 mole % water vapor), as shown in column 1, Table I. This gas was mixed with an equal volume of recycle gases at atmospheric pressure and the resultant mixture passed at 400 scc/min (2000 GHSV) into a hydrogenation reactor containing 12 cc of catalyst comprising 12% molybdenum oxide ($MoO_3$) and 6% cobalt oxide (CoO) on alumina. The temperature of the reactor was maintained at 720° F. A hydrogenated gas having the dry composition shown in column 2, Table I was recovered. This hydrogenated gas was cooled to 55° F. to remove sour condensate water, then blended with 4.22 scc/min of air and finally fed at a space velocity of 928 v/v/hr into an oxidation reactor maintained at 400° F. by suitable external means and containing 21.43 cc of a catalyst comprising 10% $V_2O_5$, 70% hydrogen Y-zeolite and 20% $Al_2O_3$ (prepared as described in Example IV). Sulfur was recovered from the off-gas in a sulfur condenser maintained at 260° F.; sour water was then condensed at 55° F. and reprocessed back to the hydrogenation reactor. After seven days operation in such manner a gas having the dry composition shown in column 3, Table I was obtained.

TABLE I

| Component | Mixture of Claus Tail and Reducing Gases Mole % | Hydrogenated Gas, Mole %, (including Recycle Gas) | Final Product |
|---|---|---|---|
| $H_2$ | 5.2333 | 4.8606 | 5.1045 |
| CO | 2.3524 | 0.9933 | 0.8781 |
| $CH_4$ | 0.0022 | 0.0195 | 0.0212 |
| $N_2$ | 85.9382 | 86.8064 | 87.2815 |
| $O_2$ | 0.0245 | 0.0075 | 0.0036 |
| $H_2S$ | 0.6256 | 0.5332 | 0.0261 |
| Ar | 0.0085 | 0.0336 | 0.0385 |
| $CO_2$ | 5.3700 | 6.7438 | 6.5888 |
| $CH_3SH$ | 0.0004 | 0.0004 | 0.0005 |
| COS | 0.0664 | 0.0014 | 0.0022 |
| $SO_2$ | 0.3175 | 0.0003 | 0.0103 |
| $CS_2$ | 0.0610 | 0.0000 | 0.0007 |
| Total Sulfur Compounds* | 1.1319 | 0.5353 | 0.0405 |
| % Overall Removal of Sulfur Compounds from Hydrogenated Gas[1] | | | 92.43 |
| % Overall Removal of $H_2S$ from Hydrogenated Gas[1] | | | 95.10 |
| % Overall Conversion of $H_2S$ in Hydrogenated Gas to Sulfur[1] | | | 93.17 |

*Expressed as moles of monatomic sulfur compounds.
Note:
[1] % overall removal and conversion results reported in all examples herein will be slightly higher than actual because the sulfur components concentrations in product compositions have been diluted with air oxidant; the effects of such dilution have been ignored.

This Example demonstrates that the theoretically determined conversion and removal of 90 to 95% of the $H_2S$ present in the hydrogenated Claus tail gas is obtainable by the process of the invention and that $H_2$, CO and light hydrocarbons remain substantially unreacted. These results were obtained despite the fact that only a relatively moderately active catalyst was utilized.

EXAMPLE II

To illustrate the effectiveness of the invention in the situation wherein a hydrogenated Claus tail gas is processed through two stages of oxidation, the 90 to 95% desulfurized gas obtained in Example I was fed to a second oxidation reactor containing the same type and amount of catalyst. This reactor, however, was maintained at 325° F. and no recycle gases from the second reactor were diverted back to the hydrogenation unit. The gas fed to the second oxidation reactor was blended with nitrogendiluted air (0.89 mole % $O_2$) entering at the rate of 2.0 scc/min, and flow rate through the reactor was at 560 v/v/hr space velocity. After condensing out sulfur at 260° F. and water at 55° F. from the effluent of the second reactor, and operating in the manner described for seven days, a gas having the following molar-percent composition (repeated on a dry basis) was obtained:

TABLE II

| Component | Mole % | Component | Mole % |
|---|---|---|---|
| $H_2$ | 5.0564 | $CO_2$ | 6.6861 |
| CO | 0.9652 | $CH_3SH$ | 0.0005 |
| $CH_4$ | 0.0205 | COS | 0.0005 |
| $N_2$ | 87.2224 | $SO_2$ | 0.0052 |
| $H_2S$ | 0.0023 | $CS_2$ | 0.0007 |
| Ar | 0.0402 | Total Sulfur Cmpds* | 0.0099 |
| % Overall Removal of Sulfur Compounds from Hydrogenated Gas of Table I | | | 98.15 |
| % Overall Removal of $H_2S$ from Hydrogenated Gas of Table I | | | 99.57 |
| % Overall Conversion of $H_2S$ in Hydrogenated Gas of Table I to Sulfur | | | 98.60 |

*Expressed on a monatomic sulfur compound basis.

This Example demonstrates that by use of two stages in series, over 98% complete removal of sulfur compounds in hydrogenated Claus tail gases can be effected. Also, as in the case of Example I, no significant oxidation of $H_2$, CO or light hydrocarbons occurs in the second oxidation stage.

As those skilled in the art will realize, it is of prime importance in this process to control the temperature rise in the oxidation reactor 14. Although the exothermic oxidations of $H_2$ and CO are not significant factors, there still exists the difficulty of dissipating or controlling (in the case of Claus tail gases) the 130° F. temperature rise per mole of $H_2S$ oxidized to elemental sulfur per 100 moles of reactor feed. Exterior cooling apparatus could of course be utilized for this purpose, but this involves unnecessary expense. Preferably, therefore, an inert diluent gas (i.e., inert under the oxidizing conditions in oxidation reactor 14) is supplied to oxidation reactor 14 from an external source to quench the temperature rise. Alternatively, recycle gases can be added directly to the oxidation reactor 14 via line 23 for temperature control or indirectly via line 25 to preheater 12 to control oxidation temperature by reducing the $H_2S$ concentration entering reactor 14. By any of these or equivalent means gas temperatures can be maintained below the thermodynamically favorable equilibrium temperature of 450° F. shown in FIG. 1.

The concentration of $H_2S$ which must be maintained by recycle gas dilution via line 25 to permit complete indirect temperature control (when using recycle gases derived from a Claus tail gas feed as herein described) depends upon the exit gas temperature from preheater 12, and is determined by dividing the difference between the desired maximum reactor outlet temperature and the said preheat exit gas temperature by 130° F./mole-percent of $H_2S$. For example, if a preferred preheat temperature of 320° F. is utilized, and a maximum peak reactor temperature of 450° F. is desired, a concentration of $H_2S$ of 1.0 mole percent or less in the gases entering the oxidation reactor will be required to maintain the reactor temperature below the peak 450° F. temperature, and in such a case there will be no requirement for external cooling or quenching.

In the preferred mode of operation, recycle gases are utilized rather than externally supplied inert gas to control oxidation temperatures. The advantages in using the recycle gases for this purpose may not at first be apparent. In addition to allowing some $SO_2$ and $H_2S$ present in these gases to be converted to sulfur (via Reaction (I)) and thus improving the overall desulfurization efficiency, the normally exothermically oxidizable components of $H_2$, CO and light hydrocarbons present in the recycle gases remain unreacted. As a result, those components do not contribute to the temperature rise in the oxidation reactor, and in fact serve as a heat sink. Since no water is formed by the oxidation of $H_2$ or light hydrocarbons, the equilibrium of Reaction (I) is not unfavorably affected. Likewise, no reaction via:

$$CO + S \rightarrow COS \qquad (XII)$$

has been observed below about 450° F. in the oxidation reactor, so that there is substantially no COS, an unrecoverable sulfur component, in the purified gaseous effluent.

Dilution of the gases entering preheater 12 or in oxidation reactor 14 with the recycle gases from line 23 serves a purpose additional to temperature control. To prevent catalyst deactivation and possible pluggage in the oxidation reactor, it is necessary that condensation of sulfur vapor in the reactor be prevented. This can be accomplished by depressing the sulfur vapor dew point temperature by diluting the gases entering, or already in, oxidation reactor 14 with recycle gases so that the partial pressure of the sulfur vapor formed therein can never exceed that necessary for condensation. Generally, however, unless the hydrogenated Claus tail gases contain more than about 10 mole percent $H_2S$, the use of recycle gases to prevent sulfur deposition is unnecessary, inasmuch as operating conditions can be selected from among those hereinbefore shown to accomplish the same result.

The most critical aspect of the invention resides in the nature of the catalyst utilized in the oxidation reactor. In general, catalysts comprising a vanadium oxide and/or sulfide supported on a non-alkaline porous refractory oxide are operative. Suitable non-alkaline supports, as defined herein, include such refractory oxides as silica, alumina, silica-alumina, silica-magnesia, zirconia, silica-zirconia, titania, silica-titania, silica-zirconia-titania, or combinations of the aforementioned materials. Acidic metal phosphates and arsenates such as aluminum phosphate, boron phosphate, chromium phosphate, rare earth phosphates, aluminum arsenate, etc., may also be used, as also may certain amorphous and crystalline aluminosilicate zeolites, including such naturally occurring zeolites as mordenite, erionite, stilbite, faujasite and the like (in their "non-alkaline" forms—as hereinafter defined). Synthetic forms of these natural zeolites can also be used with success. Synthetic hydrogen "Y" zeolites prepared by ion exchange with an ammonium salt followed by heating to decompose the zeolite ammonium ion to leave hydrogen ions are particularly contemplated as suitable supports, especially when composited with alumina to produce a support containing about 20–25 weight-percent alumina. These hydrogen "Y" zeolites are further characterized by a $SiO_2/Al_2O_3$ mole-ratio preferably in the range of 4:1 to 5:1, but those in the range of 4:1 to 6:1 or even 3.5:1 to 6:1 are also contemplated. Preferred crystalline aluminosilicate zeolites, whether natural or synthetic, consist of silica and alumina in a ratio between about 4:1 and 100:1. Especially contemplated are those natural and synthetic crystalline aluminosilicate zeolites having a silica-to-alumina ratio between about 6:1 and 100:1, mordenite and erionite, particularly in the hydrogen or decationized forms, being found to be most suitable. In general, zeolitic-supported catalysts are most active when feed gas-oxidant mixtures are contacted therewith at temperatures in excess of 350° F., at space velocities below 500 v/v/hr, and at a pressure above about 50 psig.

The "non-alkaline supports" employed herein may be characterized as materials which contain no more than about 4 weight-percent, preferably less than about 2 weight-percent of alkali metal or alkaline earth metal compounds, calculated as oxides, which compounds are sufficiently basic to form salts with anionic oxides of the active metal component, e.g., vanadates. Such salt formation is believed to be at least one alkali-induced transformation leading to rapid deactivation of the catalyst. Sodium zeolites are exemplary of such undesirable basic compounds.

Alumina is a preferred support in the oxidation process of the invention, primarily because of its stability in the presence of water vapor. Furthermore, because of the relatively low temperatures and limited quantities of oxygen encountered in this process, one tends to avoid (as will be shown in Example IV) the sulfation problems which sometimes arise when alumina-based catalysts are used in the presence of $SO_2$ plus $O_2$. Thus, unless it is necessary to treat a feed gas-oxidant mixture containing more than about 2 mole % $H_2S$, alumina and other sulfatable supports such as silica-magnesia, zirconia, silica-zirconia, titania, silica-titania, silica-zironia-titania, etc., may be used with success.

The remaining catalyst supports hereinbefore mentioned also have been found to be very stable in the presence of $SO_2$ plus $O_2$, and even $SO_3$, and their use in treating feed gas-oxidant mixtures containing more than about 2 mole percent $H_2S$ is normally feasible, even for time periods in excess of one year, depending upon other process factors. Silica, for example, does not sulfate but because of its well-known susceptibility to decomposition and volatilization in the presence of water vapor, it should not be used in environments wherein the water dew point can exceed about 120° F. Also, silica supported catalysts have been found to be of insufficient activity unless the operating pressure is above about 50 psig.

Silica-alumina supports containing at least 10 weight-percent alumina, preferably between about 20 and 30 weight-percent alumina as in high alumina, commercial cracking catalysts, are most preferred. Such catalysts not only are resistant to sulfation and water vapor attack, but they are also active when utilized under any operating pressure in the range of 0–200 psig.

The foregoing supports are compounded, as by impregnation, with from 0.2 to 30 weight-percent, preferably 2.0 to 20 weight-percent, of a vanadium promoter. Specifically, any oxide and/or sulfide of vanadium will perform satisfactorily. The preferred active metal promoter, however, is vanadium pentoxide ($V_2O_5$) when present in the catalyst between about 1 and 30 percent by weight. Especially preferred, however, is a catalyst comprising between 2 and 20 weight-percent $V_2O_5$, more preferably between about 5 and 15 weight-percent $V_2O_5$.

After being pelleted or extruded, the catalyst is subsequently dried, calcined for several hours, and then preferably reduced. This reduction can be accomplished by prereduction with hydrogen, or by utilizing hydrogen or carbon monoxide present in the feed gas. A typical prereducing procedure, and the one employed in all examples herein, comprises passing a mixture of gases consisting of 10 mole-percent $H_2S$ and 90 mole-percent $H_2$ at a temperature of about 400° F. and at a space velocity between about 400 and 600 v/v/hr over the catalyst for about two hours.

EXAMPLE III

This Example is cited to illustrate the superior performance of a catalyst of this invention versus the 13X molecular sieve catalyst of U.S. Pat. No. 2,971,824, promoted or unpromoted with vanadium. These alkaline "X" zeolite catalysts are also deemed to be comparable in most respects to the alkaline catalysts of U.S. Pat. Nos. 2,559,325 and 2,760,848.

The catalysts tested were as follows:
(1) 13X Molecular Sieve Catalysts:
   This catalyst was a commercial 1/16" extrudate of Linde 13X molecular sieve.
(2) 66.6% Na "X" Zeolite, 20% $Al_2O_3$ and 13.4% $NaVO_3$
   A solution of $NaVO_3$ was prepared by dissolving 5.0 grams of $V_2O_5$ in a solution of 2.5 grams of NaOH in 50 ml water. 44.5 grams of Na "X" zeolite (33.3 grams anhydrous) was soaked in the $NaVO_3$ solution and evaporated to dryness. Half the dried product was mixed with sufficient alumina hydrate to produce 20% $Al_2O_3$ (anhydrous) in the finished product; the mixture was pelleted with 1% hydrogenated corn oil and calcined at 932° F. for 3 hours and then reduced.
(3) 5% $V_2O_5$ and $Al_2O_3$
   A vanadium solution was prepared by dissolving 13.5 grams of $NH_4VO_3$ in 500 ml of hot (75° C.) water. This hot solution was then poured onto 270 grams of spray-dried alumina hydrate (25.8% volatiles of $H_2O$) to form a uniform paste. This was then dried at 110° C. The dried product was mulled with enough water to form an extrudable paste, which was then extruded through a ⅛" die. The extrudate was dried at 110° C., calcined at 932° F. (500° C.) for 3 hours and then reduced.

Each of the above catalysts was tested in two oxidation reactors operating in series to desulfurize a partially dried (water removed at 55° F.) hydrogenated Claus tail gas similar in dry composition to that shown in Table I. No recycle gases were utilized for any purpose and air was used as the oxidant. Sulfur and sour water were condensed at 260° F. and 55° F., respectively, from the gases leaving each oxidation reactor. Other operating conditions and the results obtained are tabulated in Table III.

TABLE III

| | Catalyst No. | | | | | |
|---|---|---|---|---|---|---|
| | (1)<br>13X Molecular<br>Sieves[1] | | (2)<br>66% Na-"X"<br>Zeolite<br>13.4% NaVO$_3$[1] | | (3)<br>5% V$_2$O$_5$<br>on Al$_2$O$_5$[4] | |
| Days of Operation | <1[3] | <1[3] | 1 | 6 | 1 | 6 |
| Total sulfur compounds entering 1st oxidation reactor, mol %[2] | 1.6084 | 1.4806 | 1.3126 | 1.3170 | 1.3521 | 1.3012 |
| Temperature of 1st oxidation reactor, °F. | 400 | 500 | 400 | 400 | 400 | 400 |
| Space velocity of 1st oxidation reactor, v/v/hr. | 2000 | 2000 | 1752 | 1752 | 1752 | 1752 |
| Total sulfur compounds leaving 1st oxidation reactor, mol %[2] | 0.3243 | 0.4546 | 0.0815 | 0.3341 | 0.0676 | 0.1749 |
| 1st oxidation, % removal of sulfur compounds | 79.84 | 69.30 | 93.79 | 74.63 | 95.00 | 86.56 |
| Temperature of 2nd oxidation reactor, °F. | X | X | 325 | 325 | 325 | 325 |
| Space velocity of 2nd oxidation reactor, v/v/hr. | X | X | 1752 | 1752 | 1752 | 1752 |
| Effluent of 2nd reactor, total sulfur compounds, mol %[2] | X | X | 0.0183 | 0.1011 | 0.0131 | 0.0175 |
| H$_2$S, mol % | X | X | 0.0127 | 0.0887 | 0.0032 | 0.0024 |
| CH$_3$SH, mol % | X | X | 0.0004 | 0.0003 | 0.0003 | 0.0004 |
| SO$_2$, mol % | X | X | 0.0033 | 0.0094 | 0.0088 | 0.0129 |
| COS, mol % | X | X | 0.0019 | 0.0025 | 0.0008 | 0.0018 |
| CS$_2$, mol % | X | X | 0.0000 | 0.0001 | 0.0000 | 0.0000 |
| O$_2$, mol % | X | X | 0.0656 | 0.3224 | 0.0000 | 0.0000 |
| H$_2$, mol % | X | X | 5.67 | 5.52 | 5.75 | 5.41 |
| Overall Sulfur Compds Removal, % | X | X | 98.60 | 92.32 | 99.03 | 98.65 |

[1] Excess air required because when only stoichiometric air was used results were not as favorable.
[2] Expressed as moles of SO$_2$ or as moles of monatomic sulfur compounds.
[3] Numerous attempts to utilize this catalyst ended in failure; no long term data available.
[4] Stoichiometric air employed.

The data in this Example demonstrate the superiority of the catalysts used in the invention in several ways. For instance, in comparing the 66.6% Na-"X" zeolite, 13X molecular sieve and 5% V$_2$O$_5$ on Al$_2$O$_3$, it is found that only the latter gives optimum results when stoichiometric oxygen is used. This is considered essential because when excess air or oxygen is necessary, as is required with catalysts (1) and (2), control problems due to accumulation of SO$_2$ develop in the system. When the conversions are compared, only the 66.6% Na-"X" zeolite initially removes H$_2$S as effectively as the 5% V$_2$O$_5$, but the 66.6% Na-"X" zeolite shows much more rapid deactivation with time. The 13X molecular sieve is found to be incapable, under the operating conditions specified, of removing even 80% of the H$_2$S in the feed gas.

EXAMPLE IV

Because the 5% V$_2$O$_5$ catalyst in Example III showed some deterioration with time, two 10% V$_2$O$_5$ catalysts were prepared as follows:

(1) 10% V$_2$O$_5$, 70% hydrogen Y-zeolite, 20% Al$_2$O$_3$: A dry mixture of 70 grams (anhydrous) steam stabilized hydrogen "Y"-zeolite, containing substantially no metal cations, plus 13 grams of NH$_4$VO$_3$ was prepared. After moistening with water to form a thin paste, the mixture was dried at 100° C., mixed with sufficient alumina hydrate to form 20% Al$_2$O$_3$ on an anhydrous basis, pelleted, calcined at 932° F. for 3 hours and then reduced.

(2) 10% V$_2$O$_5$ on alumina:

200 grams of anhydrous Al$_2$O$_3$ (as hydrated spray-dried alumina) was soaked in a hot solution of 28.5 grams of NH$_4$VO$_3$ in 500 ml water. The paste formed was dried at 90°–100° C., remoistened and extruded through a ⅛-inch die, dried at 110° C., calcined at 932° F. for 3 hours and then reduced.

Each of the above cataysts was tested in two oxidation reactors operating in series to desulfurize a partially dried (water removed at 55° F.) hydrogenated Claus tail gas similar in dry composition to that shown in Table I. No recycle gases were utilized, and stoichiometric air was used as the oxidant. Sulfur and sour water were condensed at 260° F. and 55° F., respectively, from the gases leaving each oxidation reactor. Other operating conditions and the results obtained are tabulated in Table IV.

The results shown in Table IV demonstrate an important feature of the invention. After 30 days operation, the activity of both catalysts was still remarkably high. As shown in the case of the 10% V$_2$O$_5$ on Al$_2$O$_3$ catalyst, absolutely no catalyst deactivation was detectable. Such results are typical of those obtainable with any of the catalysts described hereinbefore as being suitable for use in the process of the invention. Hence, the catalysts of the invention are not only highly active, but maintain their activity over extended periods of time.

TABLE IV

|  | 10% $V_2O_5$ on 70% Hydrogen "Y" Zeolite and 20% $Al_2O_3$ |  | 10% $V_2O_5$ on $Al_2O_3$ |
|---|---|---|---|
| Days of Operation | 30 | 1 | 30 |
| Total sulfur compounds entering 1st oxidation reactor mol % | 1.4459 | 1.3029 | 1.4042 |
| Temperature of 1st oxidation reactor, °F. | 400 | 400 | 400 |
| Space velocity thru 1st oxidation reactor, v/v/hr. | 876 | 876 | 876 |
| Total sulfur compounds leaving 1st oxidation reactor, mol % | — | 0.0623 | 0.0550 |
| 1st oxidation, % removal of sulfur compounds | — | 95.22 | 96.08 |
| Temperature of 2nd oxidation reactor, °F. | 400 | 325 | 325 |
| Space velocity thru 2nd oxidation reactor, v/v/hr. | 876 | 876 | 876 |
| Effluent of second reactor, Total sulfur compounds, mol % | 0.1617 | 0.0191 | 0.0127 |
| $H_2S$, mol % | 0.1351 | 0.0018 | 0.0063 |
| $CH_3SH$, mol % | 0.0004 | 0.0000 | 0.0005 |
| $SO_2$, mol % | 0.0239 | 0.0167 | 0.0049 |
| COS, mol % | 0.0021 | 0.0002 | 0.0010 |
| $CS_2$, mol % | 0.0001 | 0.0002 | 0.0000 |
| $O_2$, mol % | 0.0000 | 0.0078 | 0.0000 |
| $H_2$, mol % | 5.80 | 5.63 | 6.58 |
| Overall Sulfur Compounds Removal, % | 88.82 | 98.53 | 99.10 |

Each of the following three Examples describes a method for producing a catalyst useful in the oxidation of $H_2S$ to elemental sulfur as described hereinbefore.

EXAMPLE V 600 gm Zeolon, a commercial synthetic sodium mordenite manufactured by the Norton Company, was slurried in 5000 ml of 1.0 N HCl at room temperature for 60 minutes. It was then filtered and the treatment was repeated on the filter cake. The filter cake from the second treatment was slurried in hot 1.0 N HCl (73° C.) for one hour, then filtered, and finally washed on the filter with four 1000 ml washes of hot water. After the filter cake was dried, the $Na_2O$ content was 0.57% by weight (about 93% exchanged to the hydrogen form). The hot treatment was repeated twice more for 45 minutes each, after which time the $Na_2O$ level was 0.21% by weight (97.5% exchanged). The amount of aluminum extracted was relatively small so the product had a $SiO_2/Al_2O_3$ ratio of 11.5 compared to the original ratio of 10.

An amount of the dried hydrogen mordenite corresponding to 225 gm of anhydrous powder was mulled together with 424 gm of a silica hydrogel (containing about 6% $SiO_2$ or 25 gm of anhydrous silica) and 36.1 gm of $NH_4VO_3$ (or 27.8 gm of $V_2O_5$). The mixture was dried during mulling with a flow of hot air until it was of extrudable consistency. It was then extruded through a ⅛-inch die, dried, and calcined at 932° F. for 3 hours. The product containing 10% by weight of $V_2O_5$ had excellent physical properties and had a deep golden color. It was then reduced.

EXAMPLE VI

A silica hydrogel was prepared in a manner similar to that used for the preparation of the hydrogel binder of Example V. Two solutions (A) and (B) were prepared as follows:

(A) 70 ml of concentrated (96%) $H_2SO_4$ was diluted to 2500 ml with deionized water and cooled to 10° C.;

(B) 655 ml of 41° Be commercial sodium silicate (sp. gr. 1.394, 28.65 wt.% $SiO_2$ and 8.90 wt.% $Na_2O$) was diluted to 2500 ml with deionized water and cooled to 10° C. When equal volumes of (A) and (B) were mixed, the pH was too low for rapid gelation, so 3.0 gm NaOH was dissolved in solution (B).

Solution (B) was poured rapidly into Solution (A); with stirring and after 4½ minutes the mixture set to a vibrant hydrogel. After syneresis overnight, the hydrogel was cut into ½- to 1-inch pieces and placed on a large Büchner funnel. It was washed free of sodium by soaking in 0.3 N $HNO_3$ for half an hour, followed by draining and repeating of this sequence four times. The product so formed was then washed with water in the same way for a total of five times.

The hydrogel was partially dried and then mulled with enough $NH_4VO_3$ to give 10% by weight of $V_2O_5$ and 90% by weight of $SiO_2$ in the final calcined product. The moisture content of the mulled mixture was adjusted until an extrudable product was formed. It was then extruded, dried, calcined and reduced as in Example V.

EXAMPLE VII

An aluminum phosphate hydrogel was prepared substantially as described in Example IV of U.S. Pat. No. 3,147,227. A slight excess of $Al_2O_3$ (5–10%) remained in the preparation in order to preserve a high surface area. This hydrogel was combined with 10% $V_2O_5$ as in Example VI and finished in the same way.

The effectiveness of the process for desulfurizing or removing $H_2S$ from gases containing light hydrocarbons is aptly demonstrated in the treatment of sour natural gases. Since these gases generally comprise $H_2S$, or $SO_2$ and $H_2S$ in a $SO_2/H_2S$ mole-ratio of 0.5 or less, as the only gaseous sulfur compounds contained therein, their treatment is much simpler than that required for Claus tail gases. No pre-hydrogenation is necessary. Also, dehydration is usually not necessary, inasmuch as sour natural gases generally contain only traces of water vapor. The gases need only be blended with sufficient air, oxygen and/or $SO_2$, to provide an overall mole-ratio of $(SO_2+O_2)/H_2S$ therein of about 0.5, thus satisfying the stoichiometry of Reactions (I) and (II). The mixture of sour natural gas and, preferably stoichiometric air or oxygen, is processed through the oxidation reactor 14 at between about 250° and 450° F., but preferably between about 300° and 400° F., and at a space velocity between about 250 and 2000 v/v/hr, preferably between about 800 and 1000 v/v/hr. The gases leaving the oxidation reactor are then cooled, firstly to about 260° F. to remove molten sulfur, and then again, optionally, to below about 70°, preferably about 55° F., to condense sour water. Conversions of $H_2S$ to sulfur in reactor 14 in excess of 80%, and usually in excess of 90%, can be achieved.

EXAMPLE VIII

A sour natural gas having the composition shown in column 1, Table V was blended with sufficient air to provide a stoichiometric amount of oxygen (for Reaction (II)) and the resultant mixture was passed at atmospheric pressure and at a space velocity of 500 v/v/hr into an oxidation reactor maintained at 400° F. by external means. The catalyst in the reactor comprised 10% $V_2O_5$, 70% hydrogen "Y" zeolite and 20% $Al_2O_3$, and was prepared as described in Example IV. No recycle gases were utilized. After condensing sulfur at 260° F. and water at 55° F. from the gases leaving the oxidation reactor, a purified gaseous effluent having the composition shown in column 2, Table V was obtained.

In this Example a 93.25% removal of $H_2S$ and an 89.78% removal of sulfur compounds were effected despite a relatively low concentration of $H_2S$ in the feed. Utilization of recycle gases would further improve the removal of sulfur gases by lowering the sulfur vapor dew point temperature and permitting safe operation at lower reactor temperatures. Of prime importance, however, is the complete lack of oxidation of the desired fuel gases.

TABLE V

| Gaseous Component | (1) Mole % of Feed Gas | (2) Mole % of Product Gas |
|---|---|---|
| $H_2S$ | 0.3805 | 0.0257 |
| $CH_3SH$ | 0.0008 | 0.0003 |
| COS | 0.0012 | 0.0012 |
| $SO_2$ | 0.0000 | 0.0111 |
| $CS_2$ | 0.0000 | 0.0004 |
| Total sulfur compounds* | 0.3825 | 0.0391 |
| $CH_4$ | 88.135 | 87.6118 |
| Ethane | 4.70 | 4.60 |
| Propane | 0.92 | 0.83 |
| N-butane | 0.11 | 0.17 |
| I-butane | 0.08 | 0.00 |
| N-pentane | 0.00 | 0.26 |
| I-pentane | 0.06 | 0.00 |
| Hexane | 0.00 | 0.36 |
| $O_2$ | 0.02 | 0.02 |
| Water | 0.02 | 0.03 |
| $H_2$ | 0.32 | 0.28 |
| $N_2$ | 4.59 | 5.46 |
| $CO_2$ | 0.28 | 0.30 |

*Expressed as moles of monatomic sulfur compounds.

EXAMPLE IX

A natural gas from Casmalia, California having the dry composition shown in column 1, Table VI was blended at 150 scc/min with air at 3.0 scc/min. The resultant mixture containing slightly more than stoichiometric air for the conversion of $H_2S$ to sulfur, was fed at 100 psig and 450° F. and 500 v/v/hr into an oxidation reactor containing the 10% $V_2O_5$, 80% hydrogen mordenite, 10% silica catalyst prepared as described in Example V. The temperature in the reactor was maintained isothermally at 450° F. by external means. No recycle gases were used. After condensing sulfur at 260° F., the product gas had the composition shown in column 2, Table VI. As shown, an 84.04% removal of $H_2S$ and a 75.04% removal of sulfur compounds were effected.

TABLE VI

| Gaseous Component | (1) Mole % of Feed Gas | (2) Mole % of Product Gas |
|---|---|---|
| $H_2S$ | 0.4634 | 0.0740 |
| $CH_3SH$ | 0.0038 | 0.0014 |
| COS | 0.0005 | 0.0019 |
| $SO_2$ | 0.0028 | 0.0336 |
| $CS_2$ | 0.0009 | 0.0035 |
| Total Sulfur Compounds* | 0.4723 | 0.1179 |
| $CH_4$ | 63.42 | 62.82 |
| Ethane | 1.26 | 1.27 |
| Propane | 0.28 | 0.27 |
| N-butane | 0.16 | 0.09 |
| I-butane | 0.20 | 0.21 |
| N-pentane | 0.08 | 0.10 |
| I-pentane | 0.07 | 0.13 |
| $C_6$ Naphthenes | 0.09 | 0.07 |
| Hexanes | 0.25 | 0.20 |
| Air | 0.02 | 0.05 |
| $H_2$ | 0.07 | 0.04 |
| $N_2$ | 6.30 | 7.37 |
| $CO_2$ | 27.34 | 27.30 |

*Expressed as moles of monatomic sulfur compounds.

EXAMPLE X

A natural gas from Casmalia, California having the dry composition shown in column 1, Table VII was blended at 150 scc/min with air at 3.0 scc/min. The resultant mixture containing slightly more than stoichiometric air for the conversion of $H_2S$ to sulfur, was fed at 100 psig and 450° F. and 500 v/v/hr into an oxidation reactor containing the 10% $V_2O_5$ on silica catalyst prepared as described in Example VI. The temperature in the reactor was maintained isothermally at 450° F. by external means. No recycle gases were used. After condensing sulfur at 260° F., the product gas had the composition shown in column 2, Table VII. As shown, a 93.28% removal of $H_2S$ and an 88.35% removal of sulfur compounds were effected.

TABLE VII

| Gaseous Component | (1) Mole % of Feed Gas | (2) Mole % of Product Gas |
|---|---|---|
| $H_2S$ | 0.5804 | 0.0390 |
| $CH_2SH$ | 0.0038 | 0.0012 |
| COS | 0.0009 | 0.0042 |
| $SO_2$ | 0.0046 | 0.0183 |
| $CS_2$ | 0.0009 | 0.0031 |
| Total Sulfur Compounds* | 0.5913 | 0.0689 |
| $CH_4$ | 61.96 | 61.77 |
| Ethane | 1.40 | 1.36 |
| Propane | 0.20 | 0.21 |
| N-butane | 0.08 | 0.12 |
| I-butane | 0.12 | 0.14 |
| N-pentane | 0.01 | 0.00 |
| I-pentane | 0.25 | 0.28 |
| Air | 0.04 | 0.02 |
| $H_2$ | 0.02 | 0.02 |
| $N_2$ | 6.06 | 7.41 |
| $CO_2$ | 29.23 | 28.56 |
| Benzene | 0.0048 | 0.0053 |
| $C_6$ Naphthenes | 0.07 | 0.07 |

*Expressed as moles of monatomic sulfur compounds.

Having shown the two general methods whereby feed gases such as Claus tail gases and sour natural gases can be most effectively desulfurized, it must be pointed out that the oxidation process for treating sour natural gases is not intended to be limited to those feed gases containing $H_2S$, or $H_2S$ and $SO_2$ as the only gaseous sulfur components therein. It is possible that a feed gas could contain such components as COS, $CS_2$, etc., and that the removal of these components may be unnecessary. For example, a waste gas might contain 5 mole % $H_2S$ and less than 50 ppm of components such as COS, $CS_2$, etc. Thus, although the use of the hydrogenation-oxidation process shown previously for treating Claus tail gases would give most complete desulfurization, the use of a hydrogenation reactor to convert only 50 ppm of the gases contained in the feed would, in all probability, be uneconomical. Hence, in this, and many other situations wherein the primary requirement is to remove $H_2S$, or $H_2S$ and $SO_2$ in an $SO_2/H_2S$ mole-ratio of 0.5 or less, the simple oxidation process described for sour natural gases and exemplified in Examples VIII, IX and X may be of greatest utility.

The Claus tail gas or sour natural gas (both as examples of two types of gases which can be desulfurized by the processes hereinbefore described), after being desulfurized according to one of the embodiments hereinbefore shown, can be further treated by any of a number of post-desulfurization treatments. One such post-desulfurization treatment hereinbefore described consists of improving the efficiency of desulfurization by passing the gases through a second oxidation reactor 37 operating substantially in the manner described for the first, and then condensing sulfur from the product gas. Referring once again to FIGS. 2 and 2A, some alternative post-treatments are as follows:

(1) Post-Hydrogenation Treatment. It is anticipated that if the gases leaving the oxidation reactor 14 are to travel through extensive piping systems, it may be desirable to avoid sulfur deposition therein by converting the remaining sulfur vapor leaving condenser 19 (or bypassed around the same via line 57) to $H_2S$. One method of accomplishing this (as well as further reducing $SO_2$ concentration, thus rendering the gas less corrosive) is to combine the gases transported in lines 21 and 42 with a reducing gas from line 43 in preheater 44, and then to pass the resultant mixture preheated to between about 300° and 800° F., preferably 300° and 600° F., through line 45 to a hydrogenation reactor 46 which converts most of the remaining sulfur vapor and $SO_2$ to $H_2S$. The operating conditions and catalysts used in hydrogenation reactor 46 are essentially the same as those previously described for hydrogenation reactor 5. It will be understood however that if an excess of reducing gas was provided to preheater 3, then further addition thereof via line 43 may be unnecessary because any excess of the reducing gases, $H_2$ and CO, remains unoxidized in oxidation reactor 14 and thus passes as a reactant to hydrogenation reactor 46. Also, inasmuch as little or no COS, $CS_2$ or mercaptans should be present in the gases in line 21, two results occur: (1) lower operating temperatures (i.e., between 300° and 600° F.) can be used in hydrogenation reactor 46, and (2) no water vapor need be added with the reducing gas via line 43 unless said reducing gas is CO and insufficient water vapor is present for Reaction XI.

(2) Post-Hydrogenation-Oxidation Treatment. If the original feed gas to be desulfurized contains more than about 10 mole % sulfur components, the concentration of the gaseous sulfur compounds (usually $H_2S$, S, $SO_2$) in the gases in line 21 may still be higher than is desired. One method for further desulfurizing these gases is to hydrogenate the sulfur components contained therein according to the method of post-treatment (1) above, but instead of diverting the $H_2S$-containing gases in line 47 to a piping system 48, they may be passed, either directly via lines 49 and 50, or after lowering the water vapor content to less than about 10 volume percent in condenser 51, to line 52 from which they can be subsequently treated by oxidation in reactor 37 in the manner described hereinbefore.

(3) Post-Incineration Treatment. If the gases carried in lines 21 and 30, or recovered from sulfur condenser 39 via line 41, contain $H_2S$ in concentrations higher than allowable for the particular locality for atmospheric discharge, it may be desirable to oxidize said $H_2S$ to $SO_2$, the latter usually having a much higher discharge concentration limit. Therefore, these gases can be combined in line 53 with excess air or oxygen (for Reaction (III)) from line 54 and then passed to a catalytic or thermal incinerator 55, wherein $H_2S$ is oxidized to $SO_2$ via Reaction (III) prior to atmospheric discharge via line 56.

To demonstrate the effectiveness of post-treatment (1), the following example is provided:

EXAMPLE XI

A natural gas from Casmalia, California having the dry composition shown in column 1, Table VIII was blended with sufficient air to provide a stoichiometric amount of oxygen (for Reaction (II)) and the resultant mixture was passed at 100 psig and at a space velocity of 500 v/v/hr into an oxidation reactor maintained at 401° F. by external means. The catalyst in the reactor comprised 10% $V_2O_5$ on alumina and was prepared as described in Example IV. No recycle gases were utilized. After condensing sulfur at 260° F., the off-gases obtained (column 2, Table VIII) were combined with $H_2$ such that the $H_2$ concentration in the off-gases was 600 ppmv. The $H_2$-containing off-gases were preheated to 380° F. and the resultant mixture was fed to a hydrogenation reactor at 750 v/v/hr. The hydrogenation reactor contained the 12% $MoO_3$-6% CoO on alumina catalyst as described in Example I. The product gas from this reactor had the dry composition shown in column 3 of Table VIII.

TABLE VIII

| Component | Casmalia Natural Gas (Mole %) | Oxidation Reactor Product (Mole %) | Hydrogenation Reactor Product (Mole %) |
|---|---|---|---|
| $H_2$ | 0.00 | 0.00 | 0.01 |
| $CH_4$ | 69.32 | 69.87 | 66.28 |
| $N_2$ | 1.52 | 2.25 | 5.99 |
| Propane | 0.20 | 0.20 | 0.24 |
| Ethane | 0.88 | 0.81 | 0.85 |
| Air | 0.17 | 0.05 | 0.04 |
| $H_2S$ | 0.2900 | 0.0057 | 0.0238 |
| Isobutane | 0.16 | 0.16 | 0.17 |
| $CO_2$ | 26.54 | 25.67 | 25.38 |
| $CH_3SH$ | 0.0031 | 0.0044 | 0.0014 |
| N-butane | 0.02 | 0.00 | 0.02 |
| COS | 0.0008 | 0.0009 | 0.0009 |
| $SO_2$ | 0.0080 | 0.0132 | 0.0023 |
| N-pentane | 0.28 | 0.26 | 0.26 |
| $CS_2$ | 0.0000 | 0.0005 | 0.0000 |
| $C_6$ Naphthenes | 0.15 | 0.14 | 0.17 |
| Hexanes | 0.50 | 0.50 | 0.50 |
| Total Sulfur Compounds* | 0.3014 | 0.0252 | 0.0284 |
| % Sulfur Compounds Removal Overall | | | 90.6 |

*Expressed as moles of monatomic sulfur compounds.

As shown by the data in Table VIII, an 82.58% removal of $SO_2$ was effected. Unfortunately, the mass spectrometer does not record the proportion of sulfur vapor in any of the gaseous compositions of Table VIII. However, it is noted that the increase in sulfur compounds during hydrogenation was 32 ppm and it is assumed that this is due to the conversion of sulfur vapor to $H_2S$. Since, by calculation, the sulfur vapor in the oxidation reactor product should be between 30 and 65 ppm, it is seen that an effective removal of sulfur vapor has been accomplished.

In a specific embodiment of the invention, the one or two stage oxidation-sulfur recovery process of the invention is used to desulfurize the gaseous effluent from a one or two stage Claus plant. In essence, this merely replaces one or two of the Claus plant reactors containing a bauxite catalyst with an equal number of oxidation reactors containing any of the vanadium oxide and/or sulfide catalysts hereinbefore described; but the replacement of Claus plant reactors in this manner produces a result that is not at first apparent. In the Claus process as described hereinbefore, it is necessary to incinerate by combustion one-third of the available $H_2S$ to $SO_2$ (i.e., because the catalyst therein is essentially inactive for converting $H_2S$ to sulfur via Reaction (II)) and subsequently to recombine this portion with the other two-thirds. Theoretically, this should provide the exact stoichiometric amount of $SO_2$ oxidant required to convert the $H_2S$ in the remaining two-thirds to elemental sulfur. In practice, however, the gases entering the first, and especially the second and third, Claus reactors seldom have the requisite ratio of $H_2S/SO_2$ of 2. As a result, inefficiencies in desulfurization occur, due either to the production of excessive $SO_2$ during incineration or incomplete conversion of $H_2S$ in the catalytic reactors. The present embodiment of the invention largely avoids this problem because oxidant is fed individually to each oxidation reactor used in series, thus providing better means for controlling the oxidant concentration throughout the entire process. As an example, if a combination of a Claus plant-oxidation process employing in series one Claus reactor and two oxidation reactors (with sulfur condensers situated after each reactor) were to be used, one would insure that slightly less than the 2:1 ratio of $H_2S:SO_2$ is provided to the Claus reactor, that slightly less than the amount of oxygen necessary for the $(SO_2+O_2)/H_2S=0.5$ ratio is provided to the first oxidation reactor and that the exact stoichiometric amount of oxygen for the $(SO_2+O_2)/H_2S=0.5$ ratio is provided to the second oxidation reactor. In so doing, the over-production of $SO_2$ (above the 0.5 ratio) is avoided, the only sacrifice being a small concomitant loss in efficiency of $H_2S$ removal in the first two stages. The overall efficiency, however, of the Claus plant-oxidation process herein described will be greater than that for a three-stage Claus plant treating the same feed.

It will be apparent to those skilled in the art from the foregoing that numerous modifications of the invention are contemplated. Accordingly, any such embodiments are to be construed as coming within the scope of the invention as defined in the appended claims or substantial equivalents thereto.

We claim:

1. A process for the conversion of hydrogen sulfide to elemental sulfur, which process comprises contacting hydrogen sulfide and elemental oxygen with a solid catalyst comprising one or more vanadium promoters selected from the group consisting of vanadium oxides and sulfides on a non-alkaline, porous refractory oxide support under conditions, including a temperature between about 250° and 450° F., such that said hydrogen sulfide reacts with said oxygen to produce elemental sulfur.

2. A process for the conversion of hydrogen sulfide to elemental sulfur, which process comprises contacting, at a temperature between about 250° and 450° F., hydrogen sulfide and oxygen with a solid catalyst consisting essentially of one or more vanadium promoters selected from the group consisting of vanadium oxide and sulfides supported on a non-alkaline, porous refractory oxide, said contacting being such that a substantial proportion of said hydrogen sulfide is converted to elemental sulfur and said catalyst is utilized for at least 30 days with essentially no deactivation for the conversion of said hydrogen sulfide to elemental sulfur by reaction with oxygen.

3. A process for the conversion of hydrogen sulfide to elemental sulfur, which process comprises contacting hydrogen sulfide with a solid catalyst consisting essentially of one or more vanadium promoters selected from the group consisting of vanadium sulfides and oxides supported on a porous refractory oxide containing less than about 4 percent by weight of alkali metal and alkaline earth metal compounds, calculated as the oxides, said contacting being under conditions, including the presence of sufficient elemental oxygen and a temperature between about 250° and about 450° F., such that at least 80 percent of said hydrogen sulfide is converted to elemental sulfur by reaction with said oxygen, said contacting being carried out for at least 30 days with said catalyst maintaining substantially undiminished activity for reacting hydrogen sulfide with oxygen to produce elemental sulfur.

4. A process for the conversion of hydrogen sulfide to elemental sulfur, which process comprises the contacting of flowing gases containing hydrogen sulfide and elemental oxygen with a catalyst for at least 30 days under conditions, including a temperature between about 250° and 450° F., such that at least some of said hydrogen sulfide reacts with said elemental oxygen to produce elemental sulfur vapor, said catalyst comprising one or more vanadium promoters selected from the group consisting of vanadium oxide and sulfides supported on a non-alkaline, porous refractory oxide, and said catalyst remaining highly active for catalyzing the reaction between hydrogen sulfide and oxygen to produce elemental sulfur during said 30 days of said contacting.

5. A process as defined in claims 1, 2, 3, or 4 wherein elemental oxygen is present in essentially the stoichiometric proportion necessary to effect the full conversion of hydrogen sulfide to sulfur, and wherein at least 80% of said hydrogen sulfide is converted to sulfur, and wherein said catalyst consists essentially of between about 2 and 20 percent by weight of vanadium promoters on a support selected from the group consisting of alumina, silica, silica-alumina, and mixtures thereof, and wherein said conditions are such that essentially no sulfur deposits on the catalyst.

6. A process for the conversion of hydrogen sulfide to elemental sulfur, which process comprises (1) contacting at a temperature between about 250° and 450° F., a feed gas comprising hydrogen sulfide and elemental oxygen with a solid catalyst comprising one or more vanadium promoters selected from the group consisting of vanadium oxides and sulfides on a support material selected from the group consisting of alumina, silica-alumina, silica, acidic metal phosphates, acidic metal arsenates, the natural and synthetic amorphous and crystalline aluminosilicate zeolites in their hydrogen forms, silica-magnesia, zirconia, silica-zirconia, titania, silica-titania, silica-zirconia-titania, and combinations thereof, said contacting being under conditions such that hydrogen sulfide and oxygen in the feed gas react to produce elemental sulfur without depositing essentially any of said elemental sulfur on said catalyst, and (2) recovering a product gas stream containing elemental sulfur vapor.

7. A process for the conversion of hydrogen sulfide to elemental sulfur, which process comprises (1) passing a feed gas stream containing hydrogen sulfide and oxygen through a catalyst bed under conditions, including an inlet temperature into said bed between about 250° and 450° F., such that hydrogen sulfide and oxygen in said feed gas stream react to produce elemental sulfur vapor, said catalyst consisting essentially of one or more vanadium promoters selected from the group consisting of vanadium oxides and sulfides on a porous refractory oxide support selected from the group consisting of alumina, silica-alumina, silica, and combinations thereof, and (2) recovering a product gas stream containing elemental sulfur vapor.

8. A process for the conversion of hydrogen sulfide to elemental sulfur, which process comprises (1) passing a feed gas stream containing hydrogen sulfide and oxygen through a catalyst bed under conditions, including an inlet temperature into said bed between 250° and 450° F., such that hydrogen sulfide and oxygen react to produce elemental sulfur vapor, said catalyst consisting essentially of one or more vanadium promoters selected from the group consisting of vanadium oxides and sulfides on a porous refractory oxide support selected from the group consisting of alumina, silica-alumina, silica, acidic metal phosphates, acidic metal arsenates, the natural and synthetic amorphous and crystalline aluminosilicate zeolites in their hydrogen forms, silica-magnesia, a zirconia, silica-zirconia, titania, silica-titania, silica-zirconia-titania, and combinations thereof, and (2) recovering a product gas stream containing elemental sulfur vapor.

9. A process for the conversion of hydrogen sulfide to elemental sulfur, which process comprises (1) contacting flowing gases containing hydrogen sulfide and oxygen with a solid catalyst for at least 30 days under conditions, including a temperature between about 250° and 450° F., sufficient to react at least 80% of said hydrogen sulfide with said oxygen to produce elemental sulfur essentially completely in the vapor state, said catalyst comprising one or more vanadium promoters selected from the group consisting of vanadium oxides and sulfides on a porous refractory oxide support selected from the group consisting of alumina and silica-alumina, and (2) recovering a product gas containing elemental sulfur vapor.

10. A process for the conversion of hydrogen sulfide to elemental sulfur, which process comprises (1) contacting hydrogen sulfide and elemental oxygen with a solid catalyst consisting essentially of one or more vanadium promoters selected from the group consisting of vanadium oxides and sulfides on a support material selected from the group consisting of alumina, silica-alumina, silica, and combinations thereof, said contacting being under conditions, including a temperature between about 250° and 450° F. and the presence of sufficient elemental oxygen, such that a substantial proportion of said hydrogen sulfide reacts with said oxygen to produce elemental sulfur with essentially none of said elemental sulfur depositing upon the catalyst and (2) recovering a product gas containing elemental sulfur vapor.

11. A process as defined in claims 6, 7, 8, 9, or 10 wherein elemental oxygen is present in step (1) in essentially the stoichiometric proportion necessary to effect the full conversion of hydrogen sulfide to elemental sulfur, and wherein at least 80% of said hydrogen sulfide is oxidized to elemental sulfur in step (1), and wherein said catalyst contains between about 2 and 20 percent by weight of vanadium promoters, calculated as $V_2O_5$, and wherein said conditions in step (1) are such that essentially no sulfur deposits on said catalyst.

12. A process as defined in claim 11 wherein elemental sulfur is separated from said product gas obtained in step (2) and a portion of the resulting off-gas is recycled to step (1).

13. A process as defined in claim 12 wherein the remaining portion of said off gas is contacted with a catalyst comprising a combination of a Group VIB metal oxide and/or sulfide and an iron group metal oxide and/or sulfide under conditions, including the presence of hydrogen and an elevated temperature, such that essentially all of the residual sulfur vapor and $SO_2$ in said off gas is converted to hydrogen sulfide.

14. A process as defined in claim 11 wherein said catalyst is in the reduced state.

15. A process as defined in claim 11 wherein said catalyst contains vanadium promoters essentially completely in the form of $V_2O_5$.

16. A process as defined in claims 6, 7, 8, or 10 wherein said catalyst experiences substantially no deactivation for the oxidation of hydrogen sulfide to sulfur for at least 30 days of contacting in step (1).

17. A process as defined in claim 11 wherein said catalyst experiences substantially no deactivation for the oxidation of hydrogen sulfide to sulfur for at least 90 days of contacting in step (1).

18. A process as defined in claim 9 wherein said flowing gas is contacted with said catalyst at a space velocity between about 250 and 2000 v/v/hr for at least 90 days, and wherein said catalyst experiences substantially no deactivation for the oxidation of hydrogen sulfide to sulfur during said 90 days.

19. A process for the oxidation of hydrogen sulfide and the recovery of elemental sulfur, which process comprises:
(1) blending a feed gas stream containing hydrogen sulfide with air such that the resulting mixed gas stream contains a substantial proportion of oxygen;
(2) contacting said mixed gas stream with a solid catalyst comprising one or more vanadium promoters selected from the group consisting of vanadium oxides and sulfides on a porous refractory oxide support containing less than about 2% by weight of alkali metal and alkaline earth metal compounds, calculated as the oxides, said contacting being under conditions, including a temperature in the range of 250° to 450° F., such that a substantial proportion of the oxygen blended in step (1) in the form of air reacts with said hydrogen sulfide to produce elemental sulfur vapor; and
(3) recovering a gaseous effluent from step (2) containing elemental sulfur vapor and separating elemental sulfur therefrom.

20. A process for the oxidation of hydrogen sulfide and the recovery of elemental sulfur, which process comprises:
(1) blending with a feed gas stream containing hydrogen sulfide a stream of air sufficient to convert in step (2) hereinafter at least 80% of said hydrogen sulfide to elemental sulfur by reaction with the oxygen provided in said air stream;
(2) contacting the mixed gas stream produced in step (1) with a solid catalyst comprising one or more vanadium promoters selected from the group consisting of vanadium oxides and sulfides on a non-alkaline, porous refractory oxide support under conditions, including a temperature of initial contacting of said catalyst and mixed gas stream of between about 250° and 450° F., such that at least 80% of said hydrogen sulfide is converted to elemental sulfur vapor; and (3) recovering a gaseous effluent from step (2) containing elemental sulfur vapor and separating elemental sulfur therefrom.

21. A process for the oxidation of hydrogen sulfide and the recovery of elemental sulfur, which process comprises:
   (1) blending a feed gas stream containing between about 100 ppmv and 10 mole percent hydrogen sulfide with air such that the resulting mixed gas stream contains hydrogen sulfide, oxygen, and any $SO_2$ from said feed gas stream in a proportion such that the molar ratio of $(SO_2+O_2)/H_2S$ is about 0.5;
   (2) contacting said mixed gas stream with a solid catalyst consisting essentially of between about 2 and 20% by weight of one or more vanadium promoters selected from the group consisting of vanadium oxides and sulfides on a support material selected from the group consisting of alumina, silica, silica-alumina, zirconia, silica-zirconia, titania, silica-titania, silica-zirconia-titania, natural and synthetic crystalline and amorphous alumino-silicate zeolites in their hydrogen forms, acidic metal phosphates, acid metal arsenates, and combinations thereof, said contacting being under conditions, including a temperature in the range of 250° to 450° F., such that a substantial proportion of the oxygen supplied in step (1) with air reacts with hydrogen sulfide to produce elemental sulfur vapor and at least 80% of said hydrogen sulfide is converted to elemental sulfur vapor; and
   (3) recovering a gaseous effluent from step (2) containing elemental sulfur and separating elemental sulfur therefrom.

22. A process as defined in claims 19, 20, or 21 wherein said contacting in step (2) is conducted for at least 30 days without the catalyst experiencing substantially any deactivation for the oxidation of hydrogen sulfide to elemental sulfur, and wherein an off-gas is recovered in step (3) from the separation of sulfur, a portion of which off-gas is recycled to step (1).

23. A process as defined in claims 19, 20, or 21 wherein said catalyst is in the reduced state.

24. A process as defined in claim 22 wherein said mixed gas stream is contacted with said catalyst in step (2) at a space velocity between about 250 and 2000 v/v/hr.

25. A process for the oxidation of hydrogen sulfide and the recovery of elemental sulfur, which process comprises:
   (1) blending a feed gas stream containing hydrogen sulfide in a proportion between about 500 ppmv and 10 mole percent with air such that the resulting mixed gas stream contains oxygen in essentially the stoichiometric proportion necessary to oxidize said hydrogen sulfide to sulfur;
   (2) contacting said mixed gas stream with a solid catalyst consisting essentially of between about 2 and 20 weight percent of one or more vanadium oxides on silica-alumina, said contacting being under conditions, including a temperature between about 250° and about 450° F. and a gas hourly space velocity between about 250 and 2000 v/v/hr and the presence of sufficient oxygen in said mixed gas stream, such that at least about 80% of said hydrogen sulfide reacts with said oxygen and at least 80% of said hydrogen sulfide is converted to elemental sulfur vapor without depositing substantially any elemental sulfur upon the catalyst, which catalyst maintains substantially undiminished activity for reacting hydrogen sulfide with oxygen for at least 30 days of contacting;
   (3) recovering a gaseous effluent from step (2) containing elemental sulfur vapor; and
   (4) separating elemental sulfur from the other gases in said gaseous effluent by condensation.

26. A process as defined in claim 1, 2, 3, or 4 wherein a product gas is produced from said contacting containing elemental sulfur vapor and having a water vapor dew point between about 50° and 100° F.

27. A process as defined in claim 6, 7, 8, 9, or 10 wherein said conditions in step (1) are controlled such that said product gas recovered in step (2) has a water vapor dew point between about 50° and 100° F.

28. A process as defined in claim 11 wherein said product gas recovered in step (2) has a water vapor dew point between about 50° and 90° F.

29. A process as defined in claim 6, 7, or 8 wherein said feed gas contains less than about 10 volume percent water vapor.

30. A process as defined in claim 19, 20, 21, or 25 wherein said gaseous effluent recovered in step (3) has a water vapor dew point between about 50° and 100° F.

31. A process as defined in claim 30 wherein said catalyst contains a support consisting essentially of silica-alumina having an alumina content between about 20 and 30 weight percent.

32. A process for the oxidation of hydrogen sulfide and the recovery of elemental sulfur, which process comprises:
   (1) contacting a feed gas stream containing hydrogen sulfide and containing less than about 10 volume percent water vapor blended with a gaseous oxidant comprising elemental oxygen in a reaction zone with a solid catalyst comprising one or more vanadium promoters selected from the group consisting of vanadium oxides and sulfides on a porous refractory oxide support containing less than about 2% by weight of alkali metal and alkaline earth metal compounds, said reaction zone being maintained at between about 250° and 450° F. and at a water vapor dew point between about 50° and 100° F. such that a substantial proportion of the oxygen blended with said feed gas stream reacts with said hydrogen sulfide to produce elemental sulfur vapor; and
   (2) recovering a gaseous effluent from said reaction zone containing elemental sulfur vapor and having a water vapor dew point between about 50° and 100° F.

33. A process as defined in claim 32 wherein said catalyst consists essentially of between about 2 and 20% by weight of said vanadium promoters on a support selected from the group consisting of silica, silica-alumina, alumina, and mixtures thereof, and wherein the amount of elemental oxygen blended from said gaseous oxidant into said feed gas stream is essentially the stoichiometric amount necessary for the full conversion of said hydrogen sulfide to elemental sulfur, and wherein the conditions in said reaction zone are such that at least 80% of said hydrogen sulfide is converted to elemental sulfur and essentially no sulfur deposits on the catalyst, and wherein the elemental sulfur vapor in said gaseous effluent is removed therefrom by condensation.

34. A process as defined in claim 32 or 33 wherein said catalyst experiences essentially no deactivation for the oxidation of hydrogen sulfide to elemental sulfur for at least 90 days of contacting in step (1).

35. A process as defined in claim 32 or 33 wherein conditions are maintained in said reaction zone such that the water vapor dew point is between about 50° and 80° F. and wherein said gaseous effluent is recovered having a water vapor dew point between about 50° and 80° F.

36. A process as defined in claim 32 or 33 wherein conditions are maintained in said reaction zone such that the water vapor dew point is between about 50° and 90° F. wherein said gaseous effluent is recovered having a water vapor dew point between about 50° and 90° F.

37. A process as defined in claim 36 wherein said catalyst support consists essentially of silica-alumina having an alumina content between about 20% and 30% by weight.

38. A process as defined in claim 36 wherein said contacting of said feed gas stream blended with said gaseous oxidant and said catalyst is at a space velocity between about 250 and 2000 v/v/hr.

39. A process as defined in claim 38 wherein said catalyst support consists essentially of silica-alumina having an alumina content between about 20% and 30% by weight.

40. A process as defined in claim 34 wherein conditions are maintained in said reaction zone such that the water vapor dew point is between about 50° and 90° F. and wherein said gaseous effluent is recovered having a water vapor dew point between 50° and 90° F.

41. A process as defined in claim 40 wherein said catalyst support consists essentially of silica-alumina having an alumina content between about 20% and 30% by weight.

42. A process as defined in claim 41 wherein said contacting of said feed gas stream blended with said gaseous oxidant and said catalyst is at a space velocity between about 250 and 2000 v/v/hr.

43. A process as defined in claim 42 wherein said catalyst support consists essentially of silica-alumina having an alumina content between about 20% and 30% by weight.

* * * * *

UNITED STATES PATENT AND TRADEMARK OFFICE
CERTIFICATE OF CORRECTION

PATENT NO. : 4,311,683

DATED : January 19, 1982

INVENTOR(S) : Robert H. Hass and Rowland C. Hansford

It is certified that error appears in the above—identified patent and that said Letters Patent is hereby corrected as shown below:

In column 25, line 29, "a" is to be deleted.

In foreign patent documents cited, the reference to "733064" is to be changed to "733004."

Signed and Sealed this

Eleventh Day of May 1982

[SEAL]

Attest:

GERALD J. MOSSINGHOFF

Attesting Officer    Commissioner of Patents and Trademarks